US007813010B2

(12) United States Patent
Michiie et al.

(10) Patent No.: US 7,813,010 B2
(45) Date of Patent: Oct. 12, 2010

(54) DOCUMENT READING APPARATUS, IMAGE PROCESSING APPARATUS, IMAGE FORMING APPARATUS, AND COPYING MACHINE

(75) Inventors: Norio Michiie, Tokyo (JP); Hiroshi Arai, Tokyo (JP); Sachiko Nishikino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1412 days.

(21) Appl. No.: 11/197,549

(22) Filed: Aug. 5, 2005

(65) Prior Publication Data
US 2006/0028696 A1    Feb. 9, 2006

(30) Foreign Application Priority Data

| Aug. 6, 2004 | (JP) | ............... 2004-231130 |
| Aug. 31, 2004 | (JP) | ............... 2004-253405 |
| May 10, 2005 | (JP) | ............... 2005-137267 |

(51) Int. Cl.
*H04N 1/40* (2006.01)
*H04N 1/04* (2006.01)
*G03G 15/00* (2006.01)

(52) U.S. Cl. .................. 358/474; 358/449; 358/488; 399/376

(58) Field of Classification Search ................. 358/1.9, 358/449, 474, 488, 497; 399/370, 376, 386, 399/389; 250/208.1, 559.19
See application file for complete search history.

(56) References Cited

U.S. PATENT DOCUMENTS

| 5,414,522 | A | 5/1995 | Moriya |
| 5,500,725 | A | 3/1996 | Takasu et al. |
| 5,778,276 | A | 7/1998 | Hasegawa |
| 5,973,797 | A * | 10/1999 | Tanaka et al. ............... 358/488 |
| 6,266,512 | B1 | 7/2001 | de Koning et al. |
| 2002/0110389 | A1 | 8/2002 | Ozawa |
| 2004/0100667 | A1 | 5/2004 | Oyama et al. |

FOREIGN PATENT DOCUMENTS

| JP | 10-257255 | 9/1998 |
| JP | 11150634 | 6/1999 |
| JP | 2000-138798 | 5/2000 |
| JP | 2003-198809 | 7/2003 |
| JP | 2003-250028 | 9/2003 |
| JP | 2004-96157 | 3/2004 |

OTHER PUBLICATIONS

Japanese Office Action, date mailed May 6, 2010, 4 pages.

* cited by examiner

*Primary Examiner*—James A Thompson
(74) *Attorney, Agent, or Firm*—Oblon, Spivak, McClelland, Maier & Neustadt, L.L.P.

(57) ABSTRACT

A driving unit drives an illuminating light. An image pick-up device reads a document in a main-scanning direction. An optical unit projects an image of the document onto the image pick-up device. An extracting unit extracts image signals at a plurality of points in the main-scanning direction of a first position and a second position in a sub-scanning direction. A document detecting unit creates binary data indicating a presence of the document at each of the points based on the image signals extracted. A size detecting unit determines a size of the document in the main-scanning direction based on a distribution of presence and absence of the document.

21 Claims, 22 Drawing Sheets

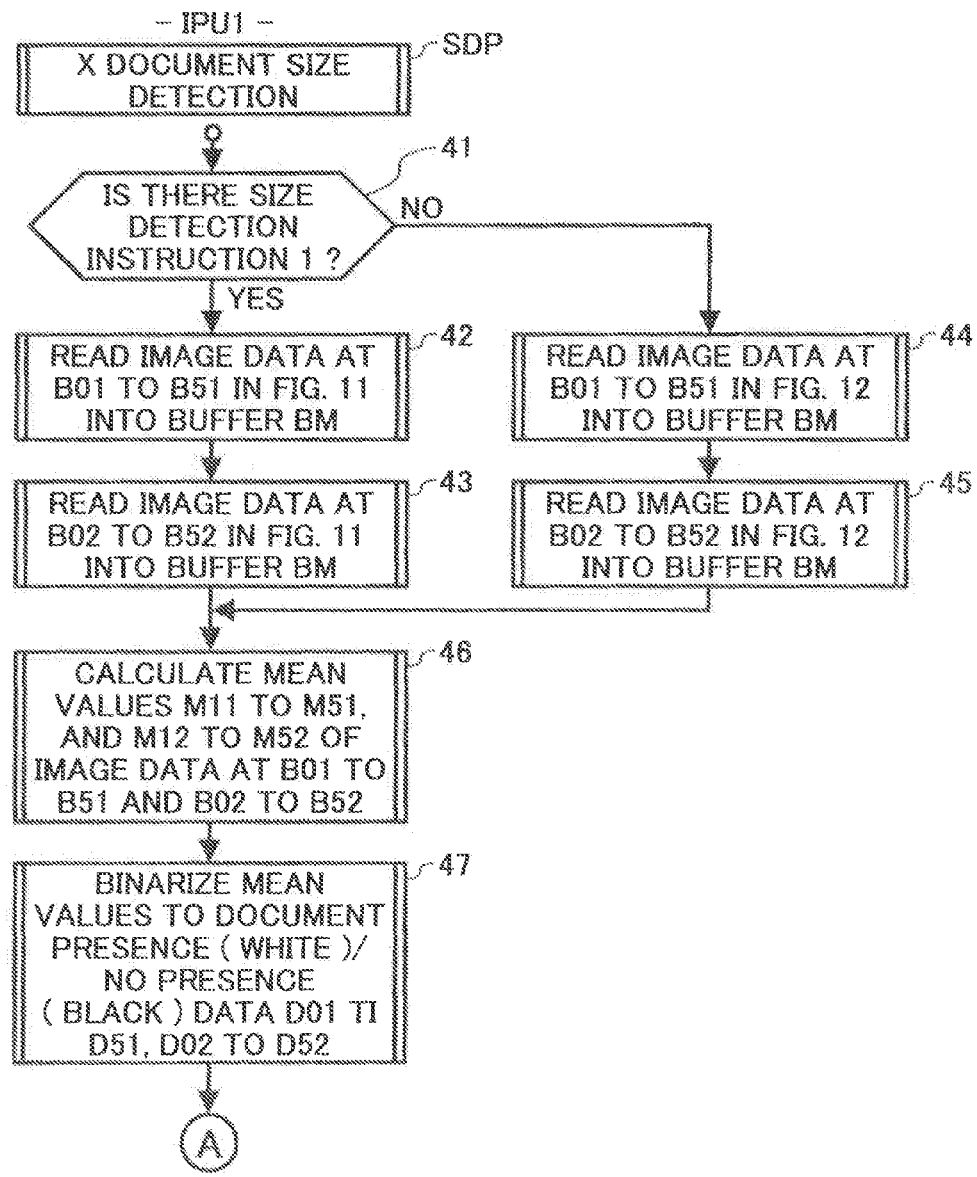

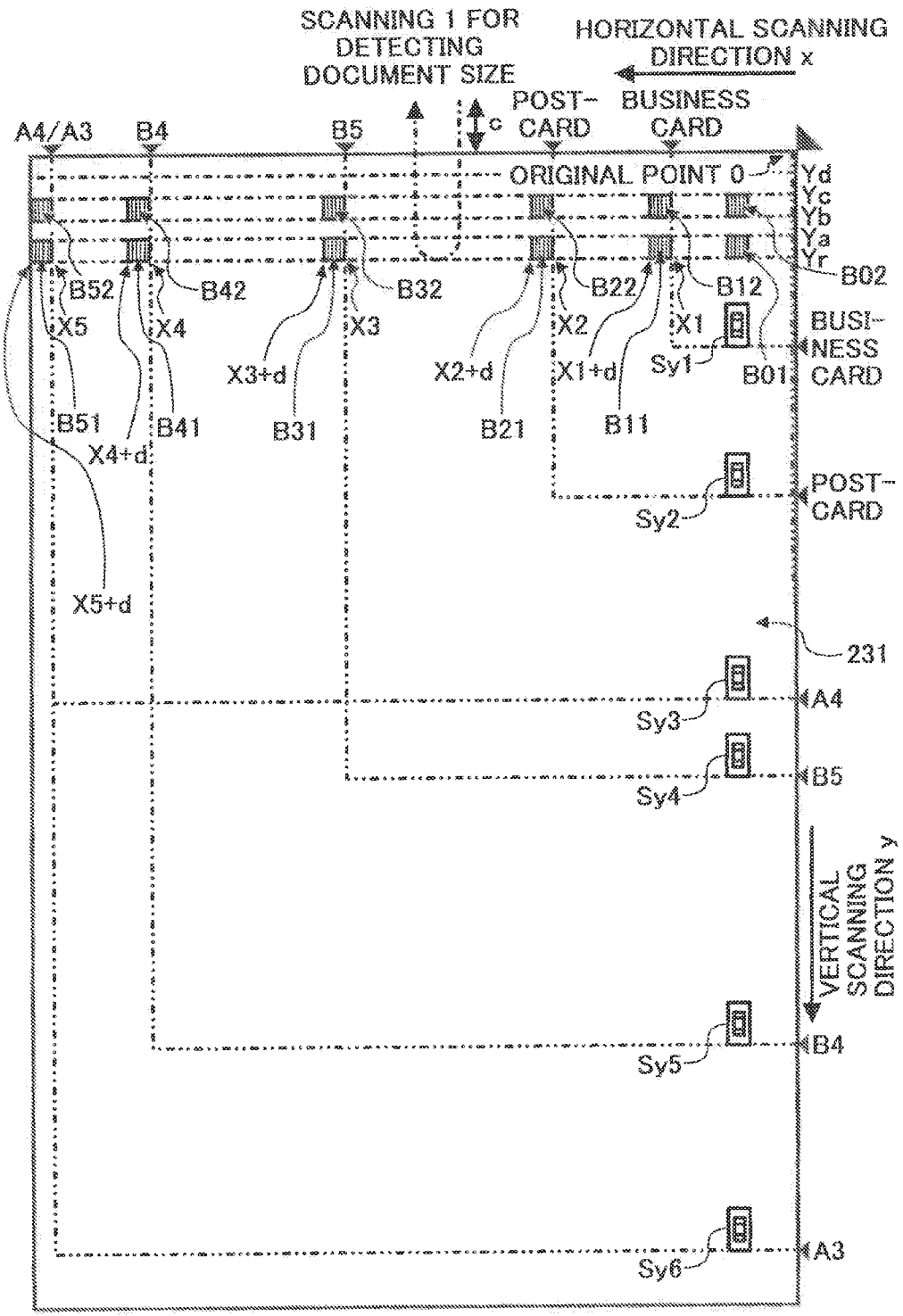

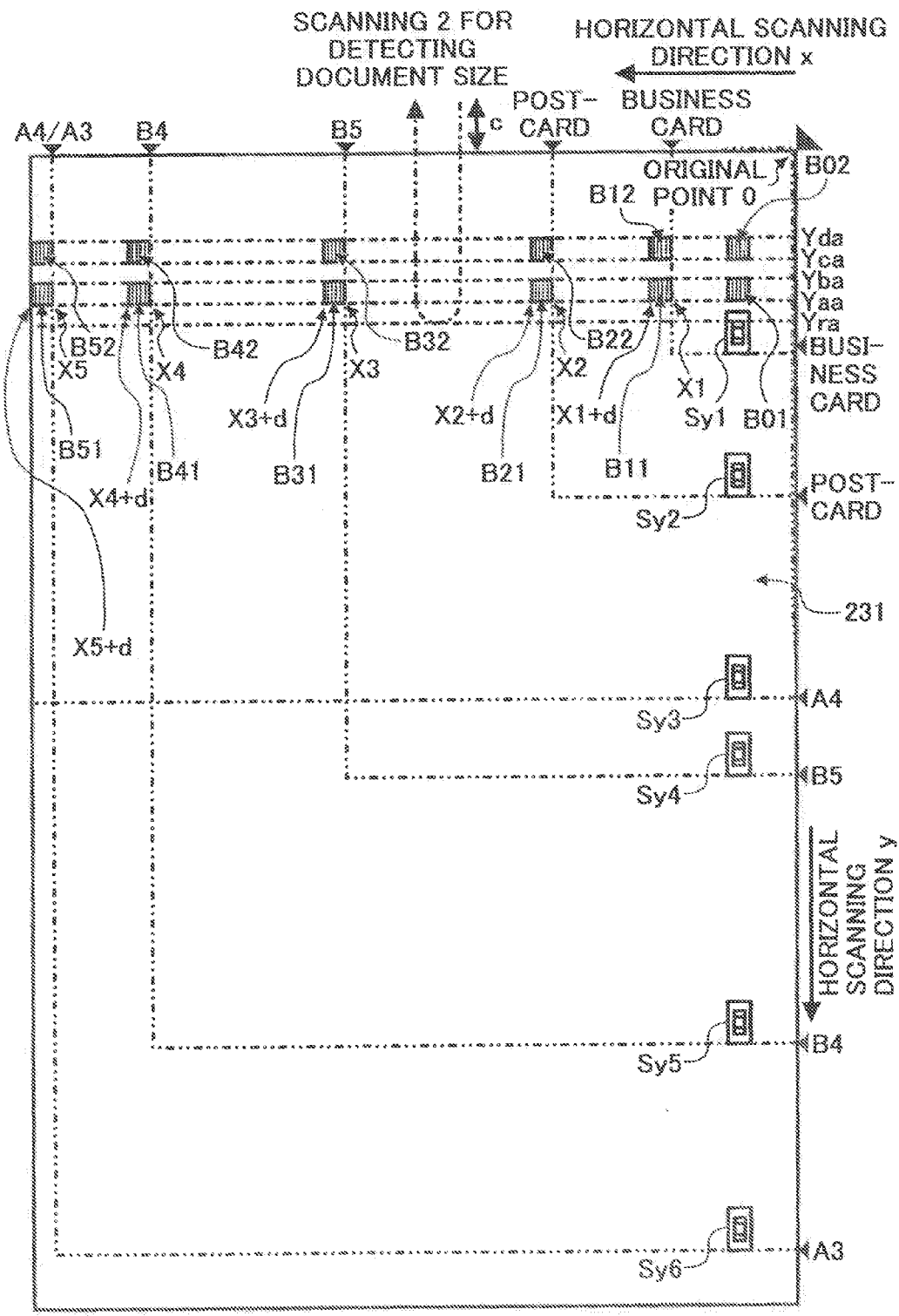

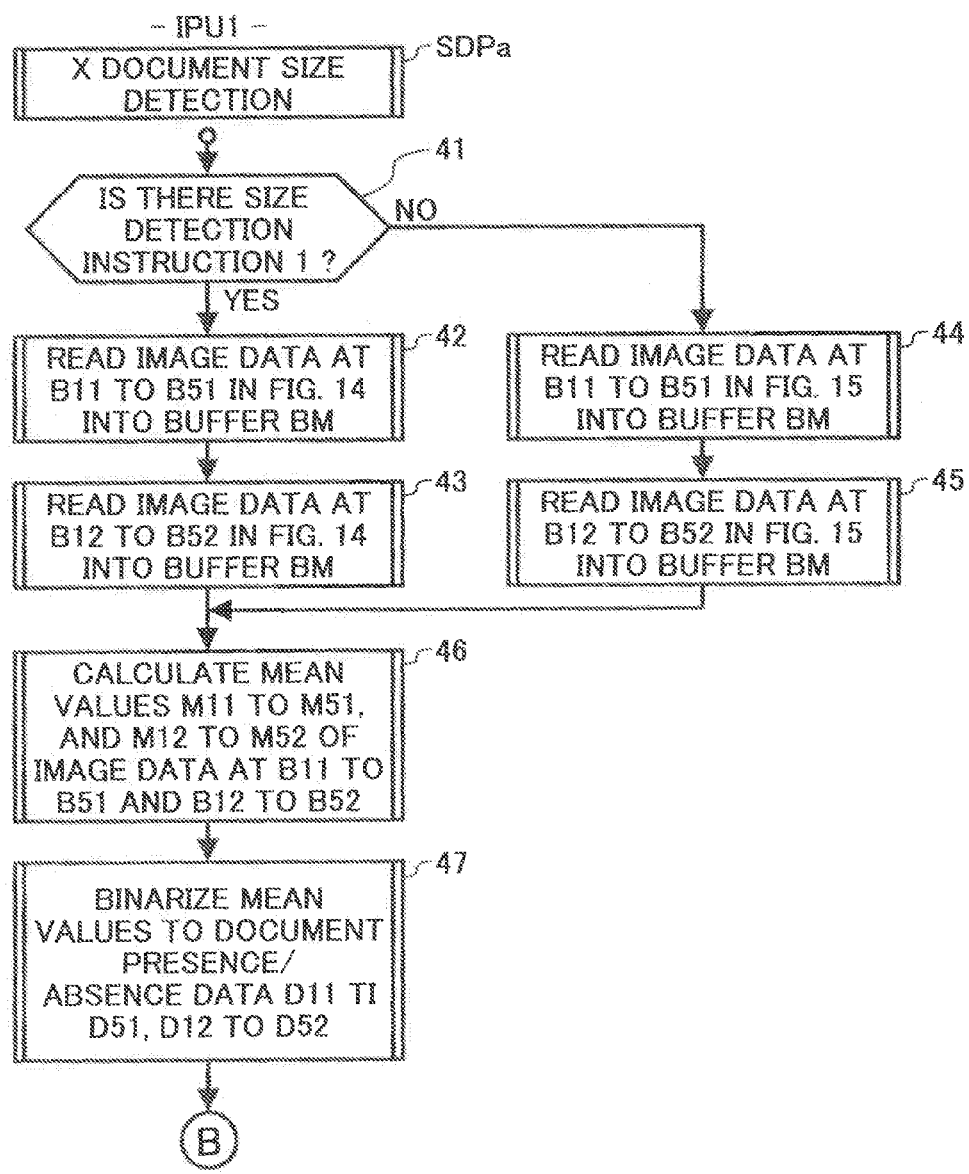

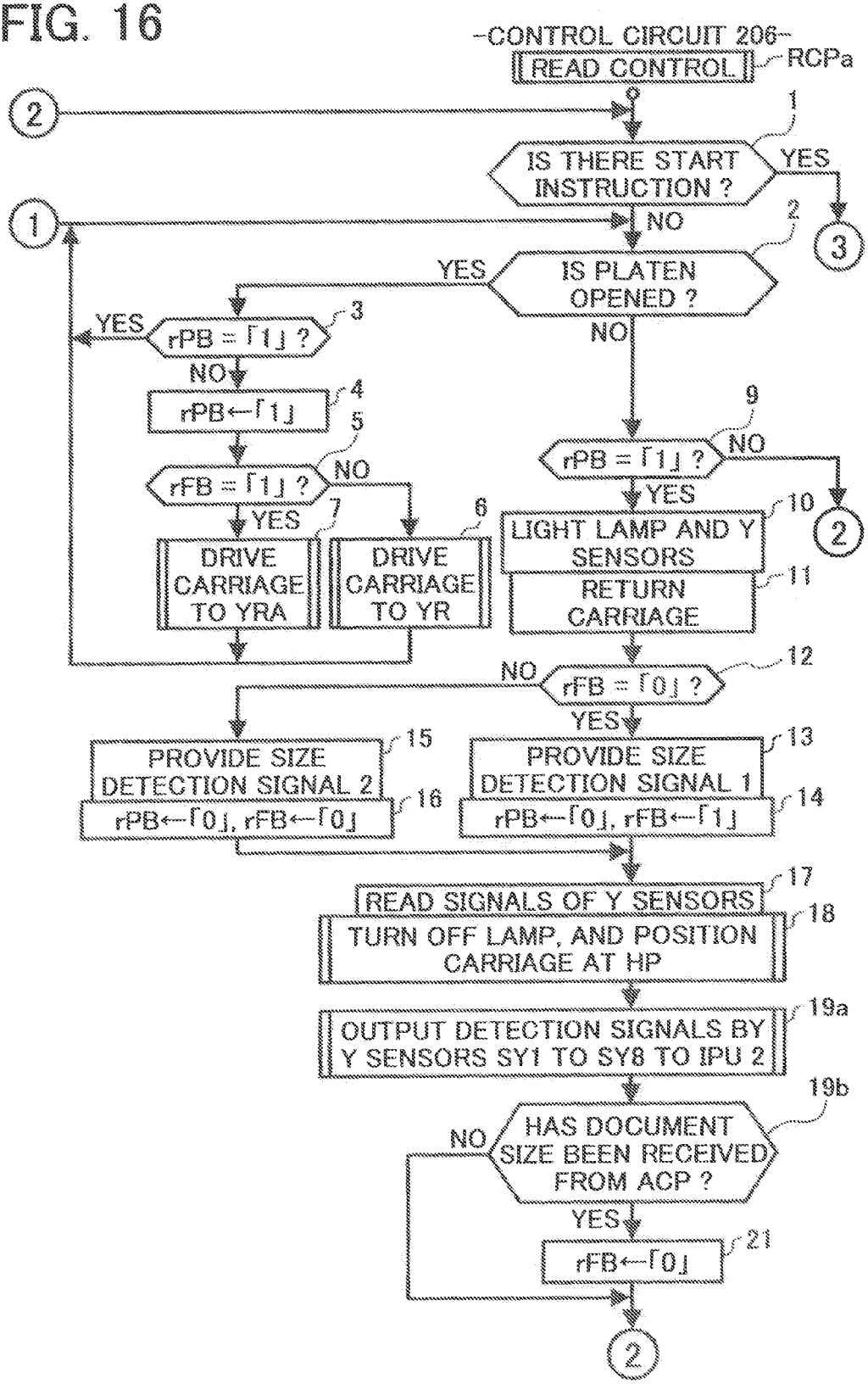

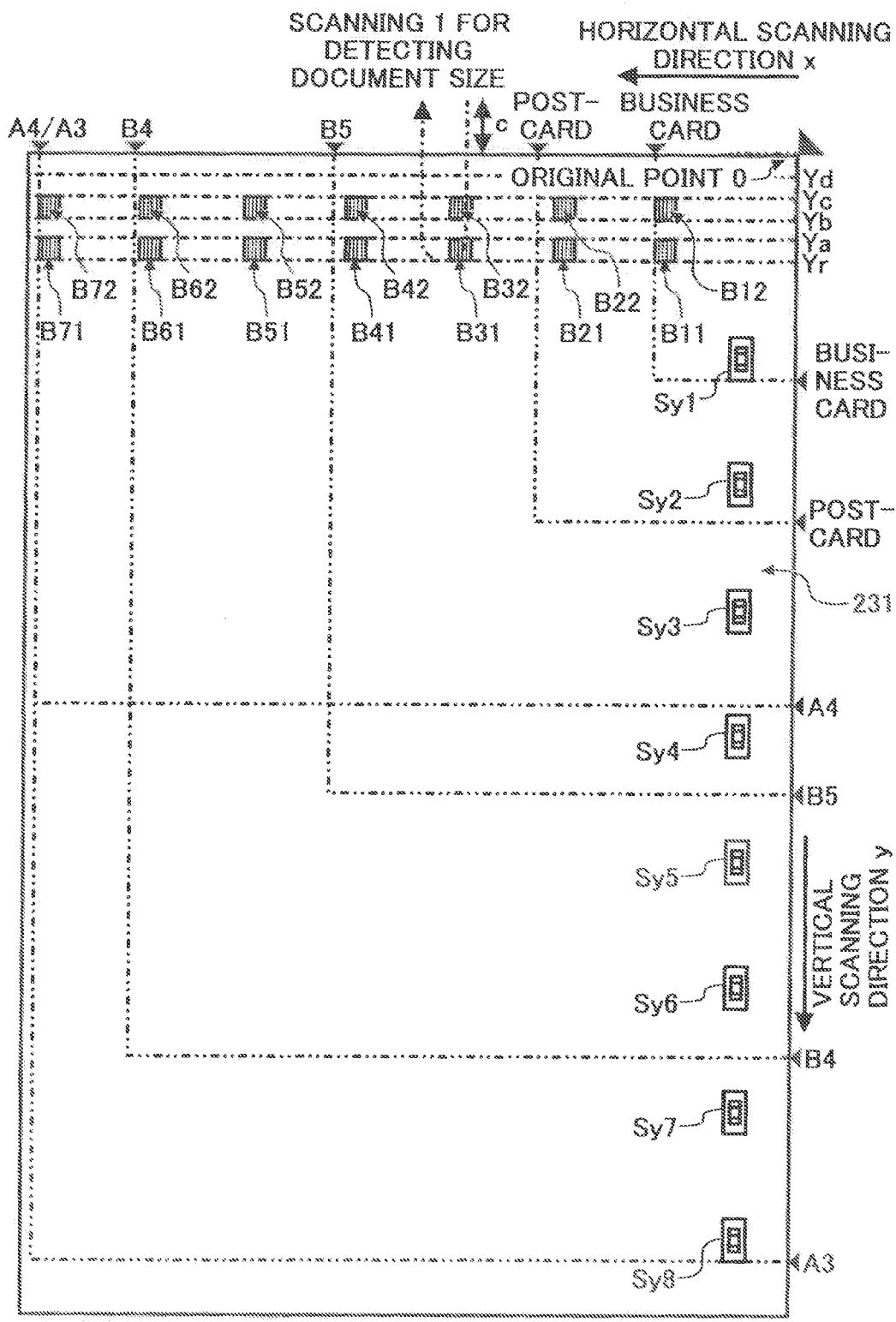

DOCUMENT READING APPARATUS, IMAGE PROCESSING APPARATUS, IMAGE FORMING APPARATUS, AND COPYING MACHINE

CROSS-REFERENCE TO RELATED APPLICATIONS

The present document incorporates by reference the entire contents of Japanese priority document, 2004-231130 filed in Japan on Aug. 6, 2004 and 2004-253405 filed in Japan on Aug. 31, 2004 and 2005-137267 filed in Japan on May 10, 2005.

BACKGROUND OF THE INVENTION

1. Field of the Invention

The present invention relates to a document reading apparatus that reads an image of a document and creates image data representing the image, and an image processing apparatus, an image forming apparatus, and a copying machine that use the document reading apparatus, and the document reading apparatus is used, for example, for a document scanner, a digital copying machine, a multifunction printer, or a facsimile machine.

2. Description of the Related Art

One of representative image readers that read an image of a document is a flatbed type document scanner that can read not only a sheet document but also a book document, which automatically detects the document size before completing the reading and scanning operation of an original document. Conventionally, an infrared ray sensor has been used as a method of detecting the document size at the time of read by the flatbed method. Recently, however, the infrared ray sensor is not used for detecting the document size in the main-scanning direction, but a method of detecting the document size by using a line sensor (charge coupled device (CCD)) for reading the image of an original document. Not only the document size in the main-scanning direction but also the document size in the sub-scanning direction is required. At the time of detecting the document size in the sub-scanning direction, it is necessary to pre-scan the entire surface of the document. This causes a delay in document read, and hence, a method of performing document size detection in the sub-scanning direction by the infrared ray sensor as usual, and document size detection in the main-scanning direction by the line sensor becomes predominant.

Japanese Patent Application Laid-Open (JP-A) No. H10-257255 discloses a document size detecting unit that uses a CCD sensor for reading the image of an original document to perform image read, and detects the edge of the document in the main-scanning direction based on the read image data, while an illumination is lighted up and a document cover starts to close and touches the document. Even when the document cover starts to close, the illumination light is reflected on the document area and the document is detected by the CCD sensor brightly until the document cover substantially touches the document. However, in the region outside the document, the illumination light is not reflected, and hence, the document is detected by the CCD sensor darkly. The difference in the brightness appears at the edge of the document in the read image data.

JP-A No. 2000-138798 discloses a document size detecting unit that drives an illumination from a home position HP to a document read position, when a document mat is opened, lights up the illumination when the document mat is closed, to detect the document size in the main-scanning direction, and returns the illumination to the HP. The size in the sub-scanning direction is detected by a reflecting optical sensor.

JP-A No. 2003-198809 discloses a document size detecting unit that lights up an illumination first in the state that a document platen is closed, to read the read data by the CCD line sensor for a plurality of sampling areas in the main-scanning direction, adds the data for the sampling areas to determine whether there is a document in the sampling areas, and determines the document size in the main-scanning direction.

JP-A No. 2003-250028 discloses an image forming apparatus that detects the closing operation of a platen cover by a first detector to light an exposure lamp, shifts a scanner unit in the sub-scanning direction to perform read for a plurality of lines by an image sensor, detects completion of closure of the platen cover by a second detector, to light the exposure lamp again, shifts the scanner unit in the opposite direction to perform read for a plurality of lines by the image sensor, fixes the document size in the main-scanning direction from the two pieces of read information obtained respectively by the forward and backward movement, and detects the document size in the sub-scanning direction by using a photosensor.

JP-A No. 2004-96157 discloses a document size determination method in which it is detected whether there is a document at respective detection points, formed of n pixels including respective pixels at positions corresponding to the document widths in the main-scanning direction of documents having respective standard sizes and a plurality of pixels in the vicinity thereof in the main-scanning direction, based on the respective read values at the respective detection points (a mean value), to determine the document size.

JP-A No. H10-257255 discloses a method of determining the document size in the main-scanning direction, by assuming that inside of the document is white and outside of the document is black at the time of opening the platen, and is characterized such that when there is a black part inside of the document, the line sensor read position is shifted to perform size detection in the state that there are white lines inside of the document. In JP-A No. 2000-138798, the method for determining the document size in the main-scanning direction, by assuming that inside of the document is white and outside of the document is black at the time of opening the platen, is the same as in JP-A No. H10-257255, but it is characterized such that data is accumulated under two conditions, that is, when the lamp is turned on and when the lamp is turned off, to exclude the influence of disturbance light. JP-A Nos. H10-257255 and 2000-138798 have effects in that the accuracy of document size detection is improved based on the read data of two or more kinds, but do not refer to reduction of time until the platen is closed and being friendly to users' eyes. In JP-A Nos. 2003-198809 and 2004-96157, the method for determining the document size in the main-scanning direction, by assuming that inside of the document is white and outside of the document is black at the time of opening the platen, is the same as in JP-A No. H10-257255, but it is characterized such that the document size in the main-scanning direction is detected by using read data of the line sensor at a plurality of points in the main-scanning direction. In JP-A Nos. 2003-198809 and 2004-96157, the time until the platen is closed is short, but the luminous energy of the lamp when the CCD line sensor reads the image is not sufficient at the rising stage, and can be unstable. Furthermore, since the read data is simply averaged in the region in the main-scanning direction, there is a high possibility that the detection of document size in the main-scanning direction malfunctions, according to the rising of the luminous energy of the lamp and the read timing of the CCD line sensor. In JP-A No. 2003-250028, there is the same problem as in JP-A No. 2003-198809, in the first read during the closing operation of the platen cover. Since the second read in the state of the platen cover being closed is meant to read an image on the document, it is difficult to determine the document size, and the size determination processing based on a first and a second read result can be complicated.

SUMMARY OF THE INVENTION

It is an object of the present invention to at least solve the problems in the conventional technology.

A document reading apparatus according to one aspect of the present invention includes an illuminating light that illuminates a document; a driving unit that drives the illuminating light in a sub-scanning direction; an image pick-up device that reads the document in a main-scanning direction that is perpendicular to the sub-scanning direction, and outputs image signals; an optical unit that projects an image of the document illuminated by the illuminating light onto the image pick-up device; an image-signal extracting unit that extracts image signals at a plurality of points in the main-scanning direction of a first position and a second position in the sub-scanning direction, from among the image signals output; a document detecting unit that creates binary data indicating a presence of the document at each of the points, based on the image signals extracted; and a size detecting unit that determines a size of the document in the main-scanning direction based on a distribution of presence and absence of the document indicated by the binary data in the main-scanning direction when the binary data for the first position satisfies a condition for determining the size of the document size in the main-scanning direction, and when the binary data does not satisfy the condition, determines the size of the document in the main-scanning direction based on the distribution of presence and absence of the document indicated by the binary data in the main-scanning direction if the binary data for the second position satisfies the condition.

A document reading apparatus according to another aspect of the present invention includes an illuminating light that illuminates a document; a driving unit that drives the illuminating light in a sub-scanning direction; an image pick-up device that reads the document in a main-scanning direction that is perpendicular to the sub-scanning direction, and outputs image signals; an optical unit that projects an image of the document illuminated by the illuminating light onto the image pick-up device; an image-signal extracting unit that extracts image signals at a plurality of points in the main-scanning direction of a first position and a second position in the sub-scanning direction, from among the image signals output; a document detecting unit that creates binary data indicating a presence of the document at each of the points, based on the image signals extracted; and a size detecting unit that determines a size of the document in the main-scanning direction based on a distribution of presence and absence of the document indicated by the binary data in the main-scanning direction.

An image processing apparatus according to still another aspect of the present invention includes the document reading apparatus according to the above aspects; a storing unit that stores the image data; and an image-data processing unit that stores the image data from the document reading apparatus in the storing unit, and reads the image data from the storing unit.

An image forming apparatus according to still another aspect of the present invention includes the document reading apparatus according to the above aspects; a printer that forms an image on a recording medium based on the image data; and an image-data processing unit that converts the image data from the document reading apparatus into image data suitable for forming the image by the printer and outputs the image data converted to the printer.

A copying machine according to still another aspect of the present invention, which has an image storing function, includes the document reading apparatus according to the above aspects; a storing unit that stores the image data; a printer that forms an image on a recording medium based on the image data; and an image-data processing unit that stores the image data from the document reading apparatus in the storing unit, reads the image data from the storing unit, and converts the image data into image data suitable for forming the image by the printer and outputs the image data converted to the printer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is an enlarged plan view of a contact glass shown in FIG. 3, depicting points B01 to B51, and B02 to B52 at which image data is extracted by a first document size detection;

FIG. 12 is an enlarged plan view of the contact glass 231 shown in FIG. 3, depicting the points B01 to B51, and B02 to B52 at which image data is extracted by the first document size detection;

FIG. 16 is a flowchart of a part of the outline of "read control" (RCPa) by the scanner control circuit according to a third embodiment of the present invention;

FIG. 18 is an enlarged plan view of the contact glass according to the third embodiment of the present invention, depicting points B11 to B71, and B12 to B72 at which image data is extracted by the first document size detection.

DETAILED DESCRIPTION OF THE PREFERRED EMBODIMENTS

Exemplary embodiments of the present invention are explained in detail with reference to the accompanying drawings.

Figure 1:
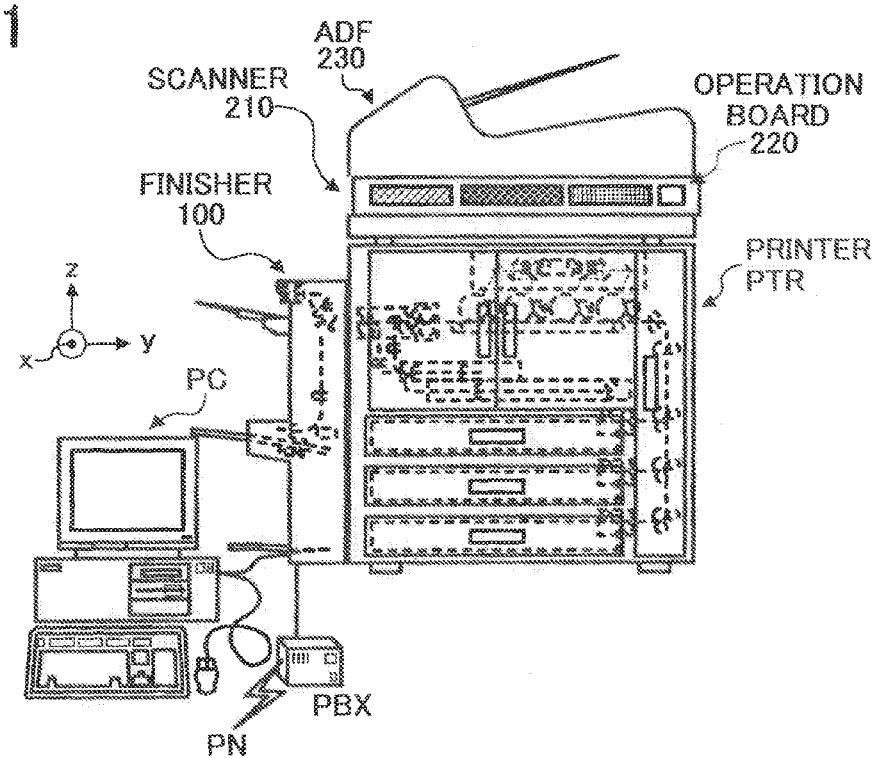
FIG. 1 is an enlarged plan view of an appearance of a full-color copying machine having a multiple image processing functions according to a first embodiment of the present invention.

FIG. 1 depicts a multifunction full-color digital copying machine according to a first embodiment of the present invention. The full-color copying machine is roughly formed of an ADF 230, an operation board 220, a color scanner 210, a color printer PTR, and a finisher 100. The operation board 220, the color scanner having the ADF 230, and the finisher 100 are units that can be separated from the printer PTR. The color scanner 210 has a control board having a power equipment driver, a sensor input, and a controller, to perform communication with an image data processor ACP (see FIG. 4) to read a document image, with the timing being controlled. A personal computer PC is connected to the image data processor ACP (see FIG. 4) of the copying machine via a local area network (LAN). An exchanger PBX connected to a telephone line PN (facsimile communication line) is connected to a facsimile control unit FCU (see FIG. 4). Paper printed by the color printer PTR is ejected to the finisher 100.

Figure 2:
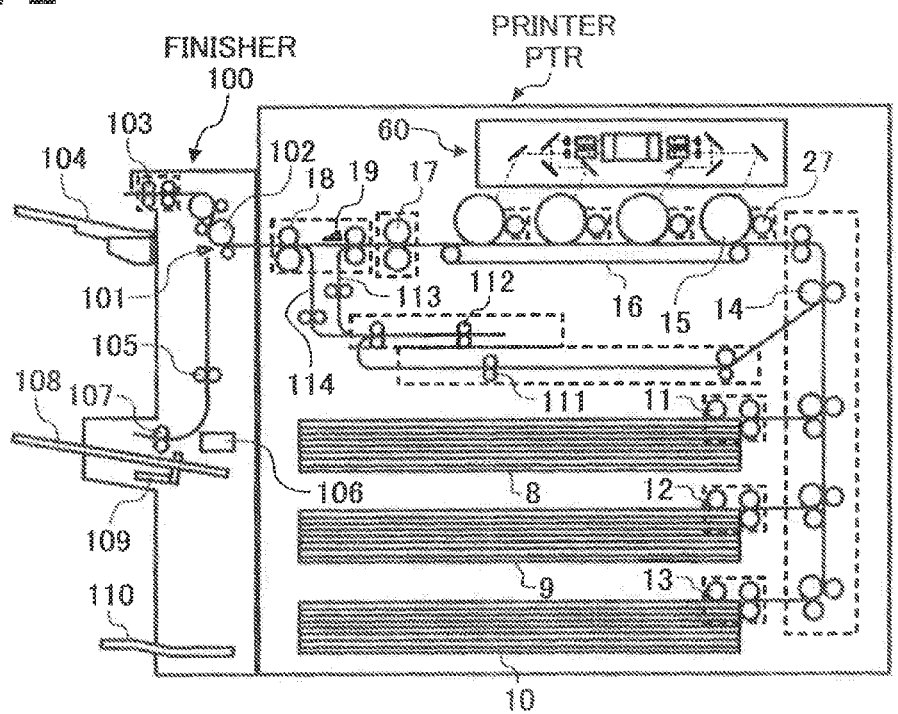
FIG. 2 is an enlarged longitudinal cross section of a color printer shown in FIG. 1.

The function of the color printer PTR is shown in FIG. 2. The color printer PTR in this embodiment is a laser printer. There are four sets (imaging units) of a photoconductor 15, a development apparatus 27, a charger (not shown), a cleaning apparatus, and a transfer unit, for each color of black (Bk), cyan (C), magenta (M), and yellow (Y) to form one color toner image, respectively, which are arranged in tandem along a carrier belt 16. The respective color toner image formed by these imaging units is superposedly transferred onto transfer paper sequentially.

The transfer paper loaded on a first tray 8, a second tray 9, and a third tray 10 is fed respectively by a first paper feeder 11, a second paper feeder 12, and a third paper feeder 13, and carried to a position abutting against the photoconductor 15 by a vertical transfer unit 14. The image data read by the scanner 50 is written on the photoconductor 15 uniformly charged by the charger (not shown) due to laser exposure from a write unit 60, thereby forming an electrostatic latent image. When the electrostatic latent image passes through the development unit 27, a toner image appears on the photoconductor 15. The toner image on the photoconductor 15 is transferred, while the transfer paper is carried on the carrier belt 16 at the same speed as the rotation of the photoconductor 15. The image is fixed by a fixing unit 17, and the transfer paper is ejected onto the finisher 100 in a post processor by a paper ejection unit 18.

The finisher 100 in the post processor shown in FIG. 2 can generally guide the transfer paper carried by the paper ejection unit 18 in the apparatus main unit toward a paper ejection roller 103 and a staple processor. The transfer paper can be ejected onto the paper ejection tray 104 side via the transfer roller 103, by switching a switch plate 101 upward. By switching the switch plate 101 downward, the transfer paper can be carried to a staple table 108 via transfer rollers 105 and 107. The transfer paper put on the staple table 108 is stapled by a stapler 106, with the edges of the paper jogged by a jogger 109 every time one sheet of paper is ejected, after completion of the copy. The transfer paper group stapled by the stapler 106 is stored in a stapled paper ejection tray 110 by the paper's own weight.

On the other hand, the normal paper ejection tray 104 is a paper ejection tray movable to the back and front (perpendicular to the page in FIG. 2). The paper ejection tray unit 104 movable to the back and front moves back and front for each document or for each unit of copies sorted by an image memory, to sort the simply ejected copying paper.

When an image is to be formed on the opposite sides of the transfer paper, the transfer paper fed from one of the paper feed trays 8 to 10 and imaged is not guided to the paper ejection tray 104 side, but temporarily guided to a reversing unit 112, by rotating a separating claw 19 for changing the route downward, and stacked in a two-sided paper feed unit 111.

The transfer paper stacked in the two-sided paper feed unit 111 is fed again from the two-sided paper feed unit 111 to transfer the toner image formed on the photoconductor 15, and is guided to the paper ejection tray 104 by returning the separating claw 19 for changing the route to the horizontal position. When the image is to be formed on the opposite sides of the transfer paper, the reversing unit 112 and the two-sided paper feed unit 111 are used.

The photoconductor 15, the carrier belt 16, the fixing unit 17, the paper ejection unit 18, and the development unit 27 are driven by a main motor (not shown), and the drive of the main motor is transmitted by respective paper feed clutches (not shown), thereby driving the respective paper feeders 11 to 13. The vertical transfer unit 14 is driven by transmitting the drive of the main motor by an intermediate clutch (not shown).

Figure 3:
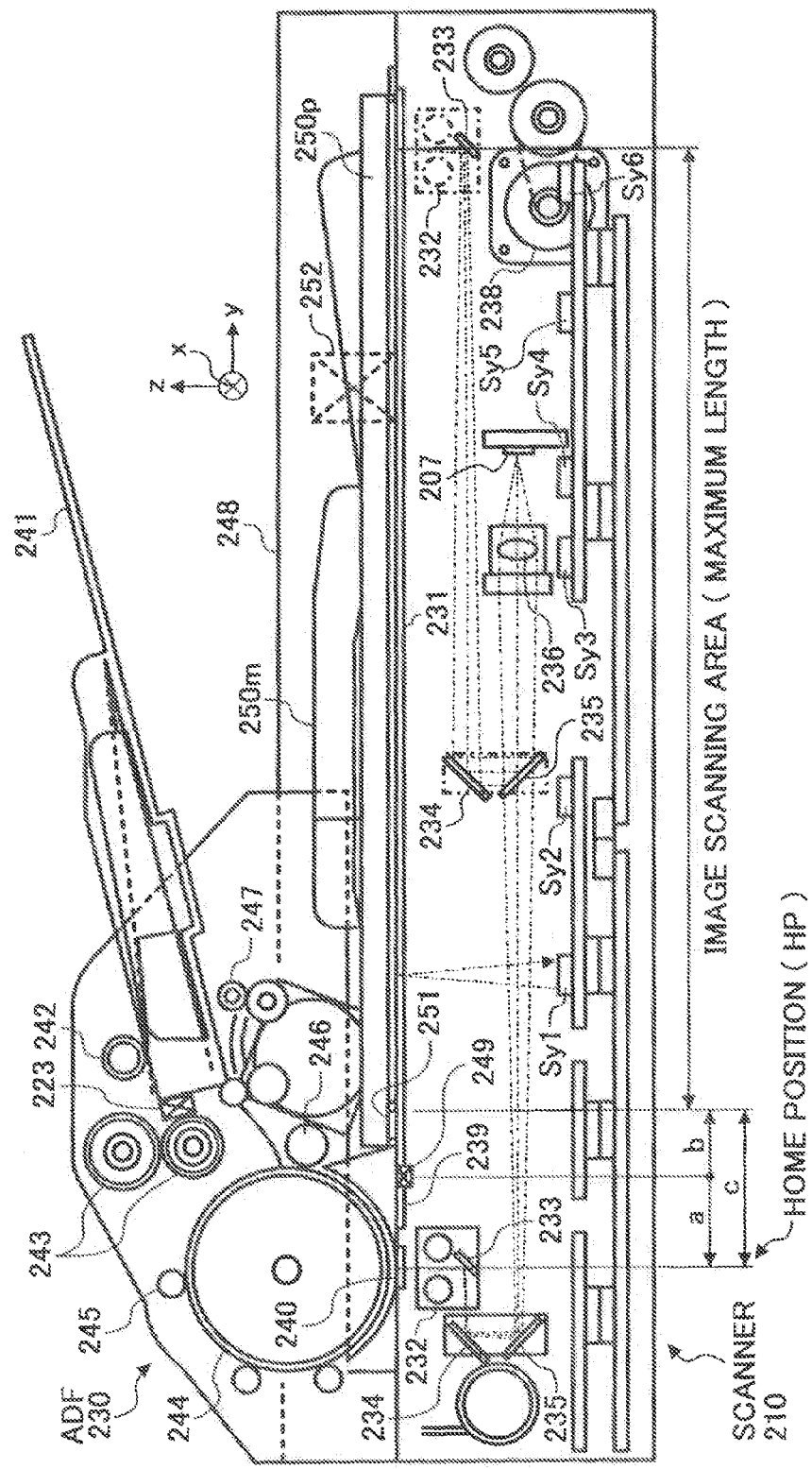
FIG. 3 is an enlarged longitudinal cross section of a color scanner and an automatic document feeder (ADF) shown in FIG. 1.

FIG. 3 depicts the scanner 210 and a document image read mechanism of the ADF 230 mounted to the scanner 210. The document placed on the contact glass 231 of the scanner 210 is illuminated by an illumination lamp 232 and the reflected light (image light) from the document is reflected by a first mirror 233 in parallel with a sub-scanning direction y. The illumination lamp 232 and the first mirror 233 are mounted to a first carriage (not shown) driven at a constant speed in the sub-scanning direction y. Second and third mirrors 234, 235 are mounted to a second carriage (not shown) driven in the same direction at a ½ speed of the first carriage. The image light reflected by the first mirror 233 is reflected by the second mirror 234 in the downward direction (z) and reflected by the third mirror 235 in the sub-scanning direction y, converged by a lens 236, irradiated by a CCD 207, and converted to an electric signal. A first carriage and a second carriage are driven in the y direction forward (scanning the document) and backward (return), by a traveling motor 238 as a drive source. Thus, the scanner 210 is a flatbed type document scanner that scans the document on the contact glass 231 by the lamp 232 and the mirror 233 to project a document image onto the CCD 207. However, there is a glass 240, which is a sheet through read window, at a position of reading field of vision of the first mirror 233, when the first carriage halts at a home position (standby position) HP, so that sheet-through read is also possible, and the automatic document feeder (ADF) 230 is mounted above the glass 240, and a carrier drum (platen) 244 of the ADF 230 faces the glass 240.

The document stacked in the document tray 241 of the ADF 230 is fed to between the carrier drum 244 and a push roller 245 by a pick up roller 242 and a resist roller pair 243, passes on the read glass 240, stuck to the carrier drum 244, and ejected onto a paper ejection tray 248, which also serves as a platen, below the document tray 241 by the paper ejection rollers 246 and 247.

The image on the surface of the document is illuminated by the illumination lamp 232 shifted immediately below, when passing the read glass 240, which is a document read window, and the reflected light from the surface of the document is irradiated to the CCD 207 via the optical system including the first mirror 233 and photoelectrically exchanged. That is, the reflected light is converted to Red/Green/Blue (RGB) color image signals. The surface of the carrier drum 244 has a white background opposite to the read glass 240 and is white so as to be a white reference plane.

There are a reference whiteboard 239 and a reference point sensor 249 that detects the first carriage, between the read glass 240 and a positioning scale 251 at the document leading end. The reference whiteboard 239 is provided for correcting such a phenomenon that although a document having a uniform density is read, the read data is not uniform due to a difference in individual emission intensity of the illumination lamp 232, a difference in the main-scanning direction, and nonuniform sensitivity in each pixel of the CCD 207 (shading correction).

A base unit 248 of the ADF 230 is connected by a hinge to the base unit of the scanner 210 on the other side (the backside of the page in FIG. 3), and by holding a handle 250m on this side (the surface side of the page in FIG. 3) of the base unit 248 to pull up the base unit 248 of the ADF 230, the ADF 230 can be raised to a standing position, with an angle with the contact glass 230 being about 60 degrees. On the other side of the base unit 248 of the ADF 230, there is a platen opening degree detection switch 252 that generates a signal of a high level H ("1") indicating "open", with the angle between the base unit 248 of the ADF 230 and the contact glass 231 being about equal to or larger than 20 degrees, and a low level L ("0") indicating "close", with the angle being less than 20 degrees. A platen 250p of the ADF 230 facing the contact glass 231 is mounted to the bottom part of the ADF 230, and when the opening degree of the ADF 230 is 0, the bottom face of the platen 250p has a close contact with the upper face of the contact glass 231, as shown in FIG. 3.

When the ADF 230 is opened at about 60 degrees, with the opening degree detection signal of the platen opening degree detection switch 252 being H indicating "open", if the lamp 232 is located at a position seen from a user, below the contact glass 231, and is lighted, the light is visible to the user's eyes. However, when the ADF 230 is opened at an angle less than 20 degrees, with the opening degree detection signal of the platen opening degree detection switch 252 being L indicating "close", even if the lamp 232 is located at a position seen from outside, below the contact glass 231, and is lighted, the light is blocked by the platen 250p, and is hardly visible to the user's eyes.

Reflecting type optical sensors Sy1 to Sy6 for determining the document size in the sub-scanning direction y are arranged at positions at which the movement in the sub-scanning direction of the carriage is not interrupted, below the reciprocating optical path in the sub-scanning direction of the first and the second carriages, and the detection positions in a direction perpendicular to the contact glass 231 (z direction) of these sensors are set on the upper face (the surface of the document placed on the glass 231, which comes into contact with the glass) of the contact glass 231. The arrangement of the reflecting type optical sensors Sy1 to Sy6 on the x, y two-dimensional plane is shown in FIG. 11 (an enlarged plan view looking the contact glass 231 from above in the z direction). In this embodiment, each of the reflecting type optical sensors Sy1 to Sy6 detects, respectively, whether there is paper (document) at a position corresponding to the rear end in the sub-scanning direction y of a business card, a postcard, A4 (horizontal), B5 (vertical), B4 (vertical), and A3 (vertical) on the contact glass 231. When there is paper at the detection point on the contact glass 231 (when having received the reflected light of irradiated light), each of the reflecting type optical sensors Sy1 to Sy6 generates a document detection signal of a high level H ("1") indicating that there is paper, when there is document at the detection point on the contact glass 231 (when the sensor receives the reflected light of the irradiated light), or a low level L ("0") indicating that there is no document, when there is no document (when the sensor does not receive the reflected light of the irradiated light). Even if the base unit 248 of the ADF 230 is at an opening angle of less than 20 degrees, if there is no document and the platen 250p is away from the upper face of the contact glass 231 by several millimeters or more, the reflected light by the platen 250p of the light emitted from the reflecting type optical sensors Sy1 to Sy6 does not return to the sensors, and the document detection signal of the sensor is at the low level L indicating that there is no document. The document detection signal of the sensor at a position where there is a document on the contact glass 231 is at the high level H indicating that there is a document, even if the base unit 248 is open.

Figure 4:
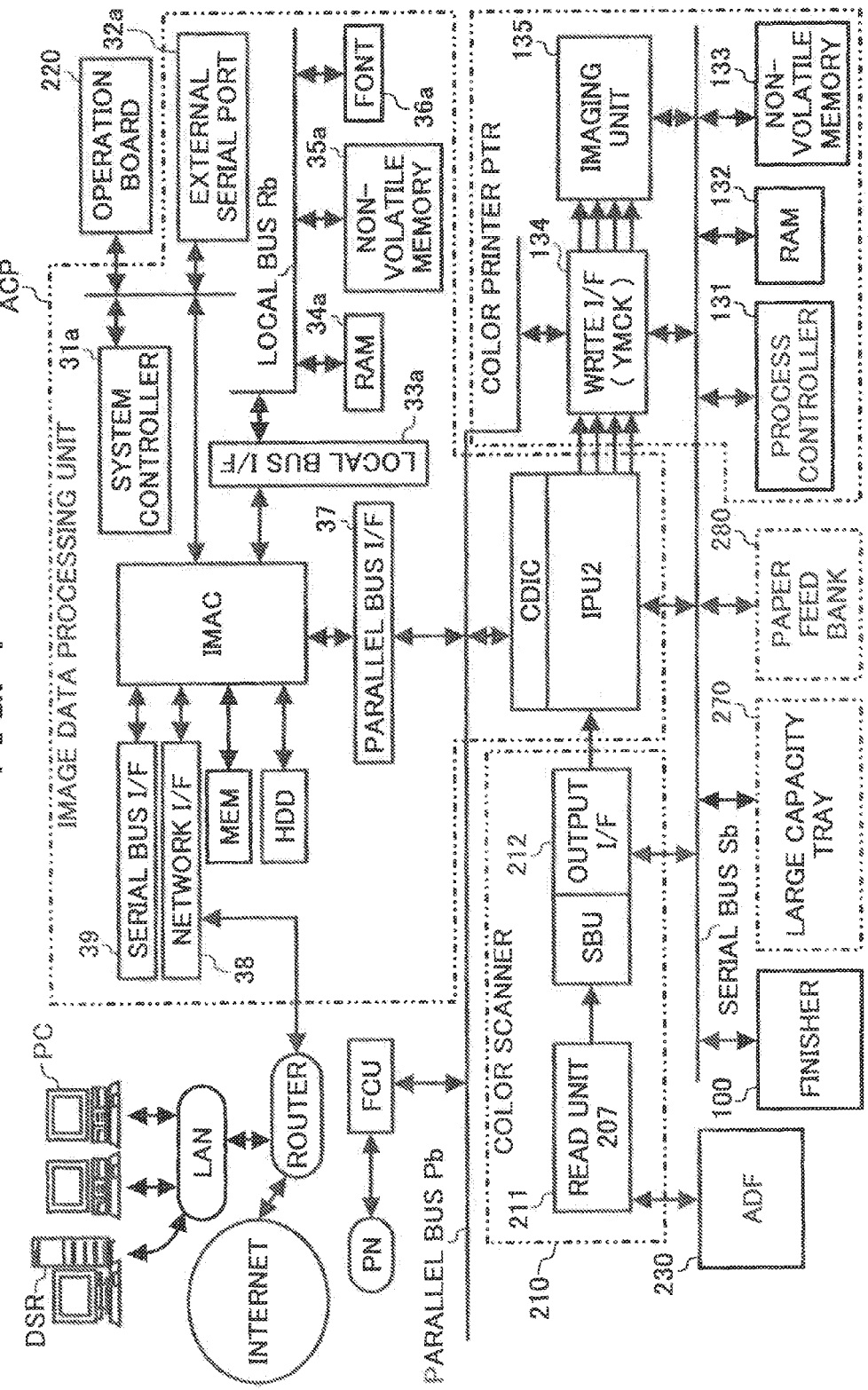
FIG. 4 is a block diagram of the configuration of an image processing system in the copying machine shown in FIG. 1.

FIG. 4 depicts the system configuration of an image processing system of the copying machine shown in FIG. 1. In this system, a color document scanner 210 including a read unit 211 and an image data output interface (I/F) 212 is connected to an image data interface control CDIC (hereinafter, "CDIC") in the image data processor ACP. The color printer PTR is also connected to the image data processor ACP. In the color printer PTR, a write I/F 134 receives Yellow/Magenta/Cyan/Black (YMCK) image data from an image-data processing unit IPU 2 (hereinafter, "IPU 2") in the image data processor ACP, and an imaging unit 135 prints out the image. The imaging unit 135 is the one shown in FIG. 2.

The image data processor ACP (see FIG. 4) is connected to a router, and a modem (not shown) connected to a hub (not shown) of the LAN to which the personal computer PC is connected, and to the Internet is connected to the router. The image data processor ACP can transfer the image data by communicating with the equipment (such as personal computer PC, server DSR, printer, scanner, and multifunction copier) connected to the LAN. Furthermore, the image data processor ACP can transfer the image data by communicating with the other equipment having the Internet communication function via the Internet. The distribution server DSR connected to the hub of the LAN is a computer that distributes a transmitted or accumulated files (E-mails, images) to specified or registered addresses (LAN connection equipment or Internet connection equipment).

The image data processor ACP (hereinafter, "ACP") includes a parallel bus Pb, an image memory access control IMAC (hereinafter, "IMAC"), an image memory MEM (hereinafter, "MEM"), a hard disc device HDD (hereinafter, "HDD"), a system controller 31a, a random access memory (RAM) 34, a nonvolatile storing unit 35, a font read only memory (ROM) 36, a CDIC, the IPU 2, and the like. A facsimile control unit FCU (hereinafter, "FCU") is connected to the parallel bus Pb. The operation board 220 is connected to the system controller 31a.

An RGB image signal generated by the image pick-up device of the CCD 207 in the read unit 211 that optically reads the document in the color document scanner 210 is processed on a sensor board unit SBU, converted to RGB image data, subjected to the shading correction, and transmitted to the CDIC via the output I/F 212.

The CDIC performs data transfer between the output I/F 212, the parallel bus Pb, and the IPU 2 for the image data, and performs communication with the system controller 31a that takes charge of the entire control between a process controller 131 and the ACP. A RAM 132 is used as a work area for the process controller 131 and a nonvolatile storing unit 133 stores the operation program and the like for the process controller 131. The HDD is provided for storing pieces of image data, in addition to the semiconductor memory MEM. By using the HDD, an external power source is not necessary, and images can be permanently stored. Images in many documents are read by the scanner and stored in the HDD, and many document images provided from the PC can be also stored in the HDD.

An image memory access controller IMAC (hereinafter, "IMAC") includes hardware and software of the same quality as those of the personal computer, to control the image data with respect to the MEM and the HDD, and write/read of the control data. Furthermore, a World Wide Web (WWW) server (software), an FTP server (software), an SMTP server (software), a DHCP server (software), and a server (software) used for transferring other files and emails are set up in the IMAC. The software (programs) is stored in the HDD.

The system controller 31a controls the operation of the respective constituents connected to the parallel bus Pb. The RAM 34 is used as the work area for the system controller 31a, and the nonvolatile storing unit 35 stores the operation program and the like for the system controller 31a.

The operation board 220 inputs processing to be performed by the ACP. For example, the operation board 220 inputs the type of the processing (copy, facsimile transmission, image read, printing, and the like) and number of pages to be processed. Accordingly, the image data control information can be input.

The RGB image data read by the scanner 210 and the CCD 207 in the ADF is subjected to image processing for correcting reading distortion, such as scanner gamma correction and filter processing, by the IPU 2, and then accumulated in the MEM. When printing out the image data in the MEM, the RGB signals are color-converted to the YMCK signals in the IPU 2, and then image quality processing such as printer gamma conversion, tone conversion, and tone processing such as dither processing or error diffusion processing is performed. The image data after the image quality processing is transferred from the IPU 2 to the write I/F 134. The write I/F 134 performs laser control according to the pulse width and the power modulation with respect to the tone-processed signal. Thereafter, the image data is transmitted to the imaging unit 135, and the imaging unit 135 forms a reproduced image on transfer paper.

The IMAC performs access control of the image data, the MEM, and the HDD under the control of the system controller 31a, expansion of the print data on a personal computer PC (hereinafter, "PC") connected to the LAN, secondary compression/expansion of the image data for effectively using the MEM and the HDD, creation of image files using various servers (software), and transfer via the LAN or the Internet.

The image data transmitted to the IMAC is accumulated in the MEM or the HDD after data compression, and the accumulated image data is read out according to need. The image data read out for printing is expanded and returned to the primarily compressed data, returned from the IMAC to the CDIC via the parallel bus Pb, and primarily expanded by the CDIC and returned to the original image data. After the transfer from the CDIC to the IPC 2, image quality processing is performed with respect to the image data, and the processed image data is output to the write I/F 134, to form a reproduced image on the transfer paper (sheet) in the imaging unit 135. When the image data is transmitted via the LAN or the Internet, the image data is transmitted to the LAN or the Internet via the network I/F 38 and the router, directly in the state of the secondarily compressed data, or after being compressed by another compression method having high compatibility with the PC.

In the flow of the image data, the functions of the digital multifunction product are realized by the bus control in the parallel bus Pb and the CDIC. Facsimile transmission is performed by executing the image processing in the IPU 2 with respect to the image data read by the scanner 210 and the ADF 230, and transferring the image data to the FCU via the CDID and the parallel bus Pb. The FCU performs data conversion for the communication network, and transmits the converted data to the public line PN as facsimile data. Facsimile reception is performed by converting the line data from the public line PN to image data by the FCU, and transferring the converted image data to the IPU 2 via the parallel bus Pb and the CDIC. In this case, special image quality processing is not performed, and the image data is output from the write I/F 134, to form a reproduced image on the transfer paper in the imaging unit 135.

When a plurality of jobs, for example, the image read function, the copy function, the facsimile transfer function, and the printer output function work in parallel, the allocation of the right of use of the read unit 211, the imaging unit 135, and the parallel bus Pb to the jobs is controlled by the system controller 31a and the process controller 131. The process controller 131 controls the flow of the image data, and the system controller 31a controls the entire system and manages start-up of the respective resources (jobs). Selection of the functions of the digital multifunction product is performed by the operation board 220, and the processing contents such as the image read function, the image data registration function, the copy function, the print function, the facsimile function, and a tandem transfer function are set according to the selection and input on the operation board 220.

The system controller 31a and the process controller 131 communicate with each other via the parallel bus Pb, the CDIC, and the serial bus Sb. Specifically, the communication between the system controller 31a and the process controller 131 is performed by converting the data between the parallel bus Pb and the serial bus Sb, and the data format for the interface in the CDIC.

Various bus interfaces, for example, a parallel bus I/F 37, a serial bus I/F 39, a local bus I/F 33a, and the network I/F 38 are connected to the IMAC. The system controller 31a is connected to associated units via a plurality of kinds of buses, in order to maintain the independence in the entire ACP.

The system controller 31a controls other functional units via the parallel bus Pb. The parallel bus Pb is used for the transfer of the image data. The system controller 31a issues an operation control command to the IMAC for accumulating the image data in the MEM and the HDD. The operation control command is sent via the IMAC, the parallel bus I/F 37, and the parallel bus Pb.

In response to the operation control command, the image data is transmitted from the CDIC to the IMAC via the parallel bus Pb and the parallel bus I/F 37. The image data is then stored in the MEM or the HDD under control of the IMAC.

On the other hand, in the case of a call from the PC as a printer function, the system controller 31a in the ACP functions as the printer controller, the network controller, and the serial bus controller. In the case of via the network, the IMAC receives the printer output request data via the network I/F 38.

In the case of general-purpose serial bus connection, the IMAC receives the printer output request data via the serial bus I/F 39. The general-purpose serial bus I/F 39 corresponds to a plurality of kinds of specifications.

The printer output request data from the PC is expanded to the image data by the system controller 31a. The expansion destination is an area in the MEM. Font data required for expansion can be obtained by referring to the font ROM 36a via the local bus I/F 33a and the local bus Rb. The local bus Rb connects the system controller 31a to the nonvolatile storing unit 35a and the RAM 34a. For the serial bus Sb, there is an interface for transfer from/to the operation board 220, which is the operation unit of the ACP, in addition to an external serial port 32a for the connection with the PC. The interface is not for the printer expansion data, but communicates with the system controller 31a via the IMAC to receive the processing procedure and display the system condition. The data transfer among the system controller 31a and the MEM, HDD, and various buses is performed via the IMAC. Jobs using the MEM and the HDD are uniformly managed in the entire ACP.

The CDIC receives the image data output from a color document scanner 210 (SBU) and outputs the image data to the IPU 2. The IPU 2 performs "scanner image processing" 190 and sends the image data to the CDIC. The CDIC performs primary compression with respect to the image data in order to increase the transfer efficiency by the parallel bus Pb. The compressed image data is sent to the parallel bus Pb. The image data input from the parallel bus Pb has been primarily compressed for the bus transfer, and hence, is expanded in the CDIC. The IPU 2 converts the RGB image data to the YMCK image data by the "image quality processing", and converts the YMCK image data to the image data Yp, Mp, Cp, Kp for image output by the printer 100, and output to the color printer 100.

The CDIC has a conversion function of the parallel data transferred on the parallel bus Pb, and the serial data transferred on the serial bus Sb. The system controller 31a transfers data to the parallel bus Pb, and the process controller 131 transfers data to the serial bus Sb. The CDIC performs parallel/serial data conversion for the communication between the two controllers 31a and 131.

Figure 5:
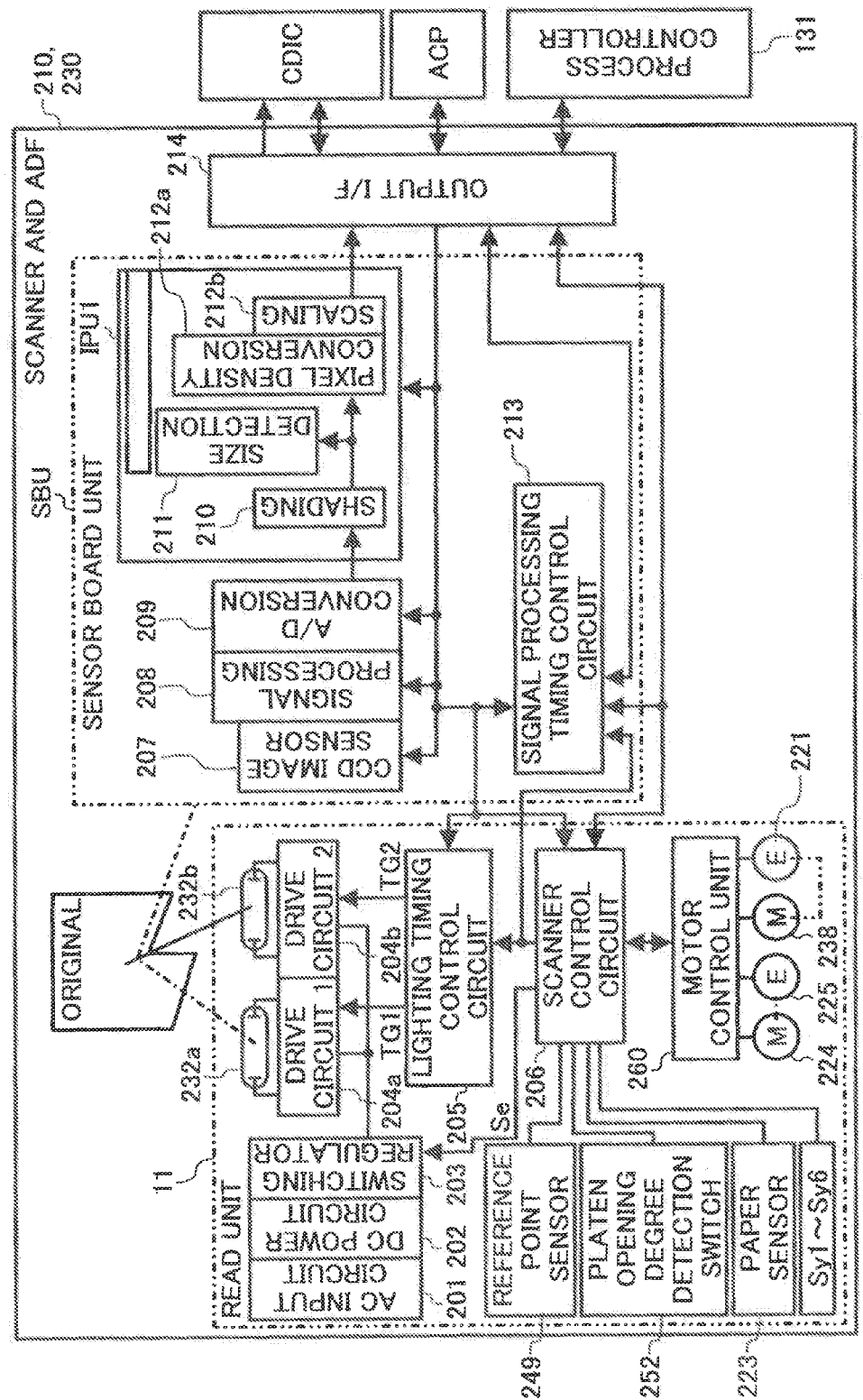
FIG. 5 is a block diagram of the outline of an electric system for a combination part of the document scanner and the ADF shown in FIG. 1.

FIG. 5 depicts the configuration of an electric system for image read in the scanner 210 and the ADF 230. The electric signal output from the image sensor 207, that is, RGB analog color signals are respectively amplified by signal processing 208, and converted to digital image signals, that is, image data by A/D conversion 209. The image data is subjected to shading correction 210, document size detection 211, pixel density conversion 212a, and scaling 212b, and output to the image data processor IPU 2 via the CDIC. In the A/D conversion 209, analog signals are digital-converted to the image data.

A scanner control circuit 206 controls a lighting timing control circuit 205, a signal processing timing control circuit 213, and a motor control unit 260 according to an instruction from the system controller 31a in the ACP and the process controller 131. The lighting timing control circuit 205 controls ON/OFF of exposure lamps 232 (232a, 232b) according to an instruction from the scanner control circuit 206, and sets the brightness (time-series mean value or smoothed value) of the exposure lamps 232 to an illuminance (luminous energy) instructed by the process controller 131 via the signal processing timing control circuit 213. Reference numerals 232a and 232b can be indicated by reference sign 232 comprehensively in some cases. The scanner control circuit 206 also performs read control (RCP) for size detection of the document placed on the contact glass 231. The contents of the processing will be explained later with reference to FIGS. 8 and 9.

The motor control unit 260 controls a vertical-scanning drive motor 238 and an ADF motor 224, according to an instruction from the scanner control circuit 206. These motors are both stepping motors, and rotary encoders (E) 221 and 225 are coupled to the shaft of a drive system. The document scanning position (y), the drive amount, the front end and rear end of a document fed by the ADF and the feed amount thereof are determined by calculating electric pulses generated by the respective rotary encoders 221 and 225. A paper sensor 223 shown in FIG. 5 includes the one for detecting whether there is a document on a document tray in the ADF 30, the one for detecting paper jam, and the one for detecting document size. The reference point sensor 249 is for detecting that the first carriage passes the reference position, and as shown in FIG. 3, a position backward from the reference position by "a" in a return direction is the home position (standby position) HP of the first carriage, which is a sheet through read position opposite to the window glass 240.

The signal processing timing control circuit 213 generates various types of signals, according to the instruction or a control signal from the scanner control circuit 206, the system controller 31a in the ACP, and the process controller 131. In other words, when image read is started, the signal processing timing control circuit 213 provides control signals including a shift gate signal SH, a transfer clock, a reset signal RS, and a clamp gate signal CLP to the image sensor 207, and outputs a pixel synchronizing clock pulse CLK, a line synchronizing signal LSYNC, and a horizontal-scanning validity signal LGATE to the system controller 31a. The pixel synchronizing clock pulse CLK is approximately the same signal as the shift clock provided to the image sensor 207. The line synchronizing signal LSYNC is a signal corresponding to a line synchronizing signal MSYNC output by a beam sensor in the imaging unit imaging unit 135 of the printer 14, but the output thereof is prohibited while image read is not performed. The horizontal-scanning validity signal LGATE becomes high level H at the timing when the image signal output by the image sensor 207 is regarded as effective (document area read period).

When having received a read start instruction from the system controller 31a in the ACP, the scanner control circuit 206 switches a control signal Se to a switching regulator 203 to a level instructing power source output ON, controls (generation of the control signal of) the signal processing timing control circuit 213 to start read of the image sensor 207, and lights up the exposure lamps 232, to drive the vertical-scanning drive motor 238 (manual feed mode) or the ADF motor (ADF mode). Furthermore, the scanner control circuit 206 sets the vertical-scanning validity signal FGATE to a high level H (outside the document area). In the manual feed mode (flatbed read method), the signal FGATE is switched to L indicating inside the document area, when the first carriage reaches a document leading end position. In the ADF mode (sheet through read method), the signal FGATE is switched to L, when the feed amount of the document (front end) from the resist roller reaches the feed amount up to a document read position in the ADF mode using the ADF 13. The vertical-scanning validity signal FGATE is switched back to H indicating outside the document area, when scanning of the rear end of the document has finished in the manual feed mode, or when the rear end of the document passes the HP in the ADF mode.

Commercial alternating current is applied to an AC input circuit 201 in the read unit 11, and a DC power circuit 202 converts the commercial alternating current to DC. The switching regulator 203 controls the DC voltage to a constant voltage by converting the DC voltage to step-up DC, and applies the constant voltage to drive circuits 204a and 204b including an inverter as a power source for a discharge lamp. In response to lighting control signals TG1 and TG2 provided by the lighting timing control circuit 205, respective inverters in the drive circuits 204a and 204b convert the high voltage DC to high voltage AC, while the vertical-scanning validity signal FGATE is at the low level L, which is a lighting instruction, to apply the high voltage AC to respective exposure lamps 232a and 232b. The exposure lamps 232a and 232b are discharge lamps, which are driven by the high voltage AC to emit light, and illuminates the document. The high level H of the respective lighting control signals TG1 and TG2 is a light out instruction, and when the respective lighting control signals TG1 and TG2 are switched to the high level H, the respective inverters in the drive circuits 204a and 204b stops conversion of the high voltage DC to the high voltage AC, that is, stops high voltage AC output to the exposure lamps, and as a result, the exposure lamps 232a and 232b turn off.

There is a first image processing unit IPU 1 in the sensor board unit SBU.

Figure 6A:
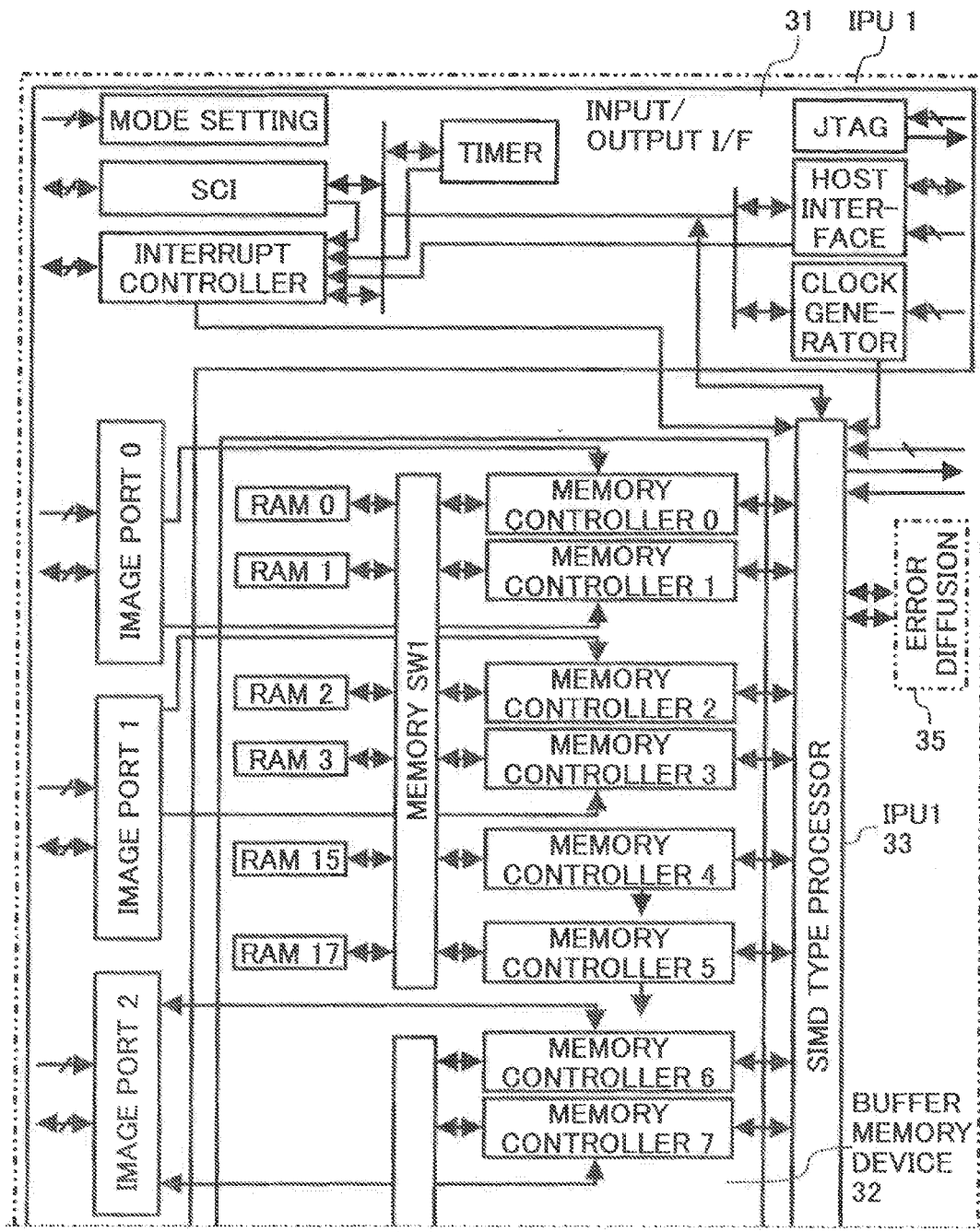
FIG. 6 is a block diagram of the outline of the hardware configuration of an IPU shown in FIG. 5.
Figure 6B:
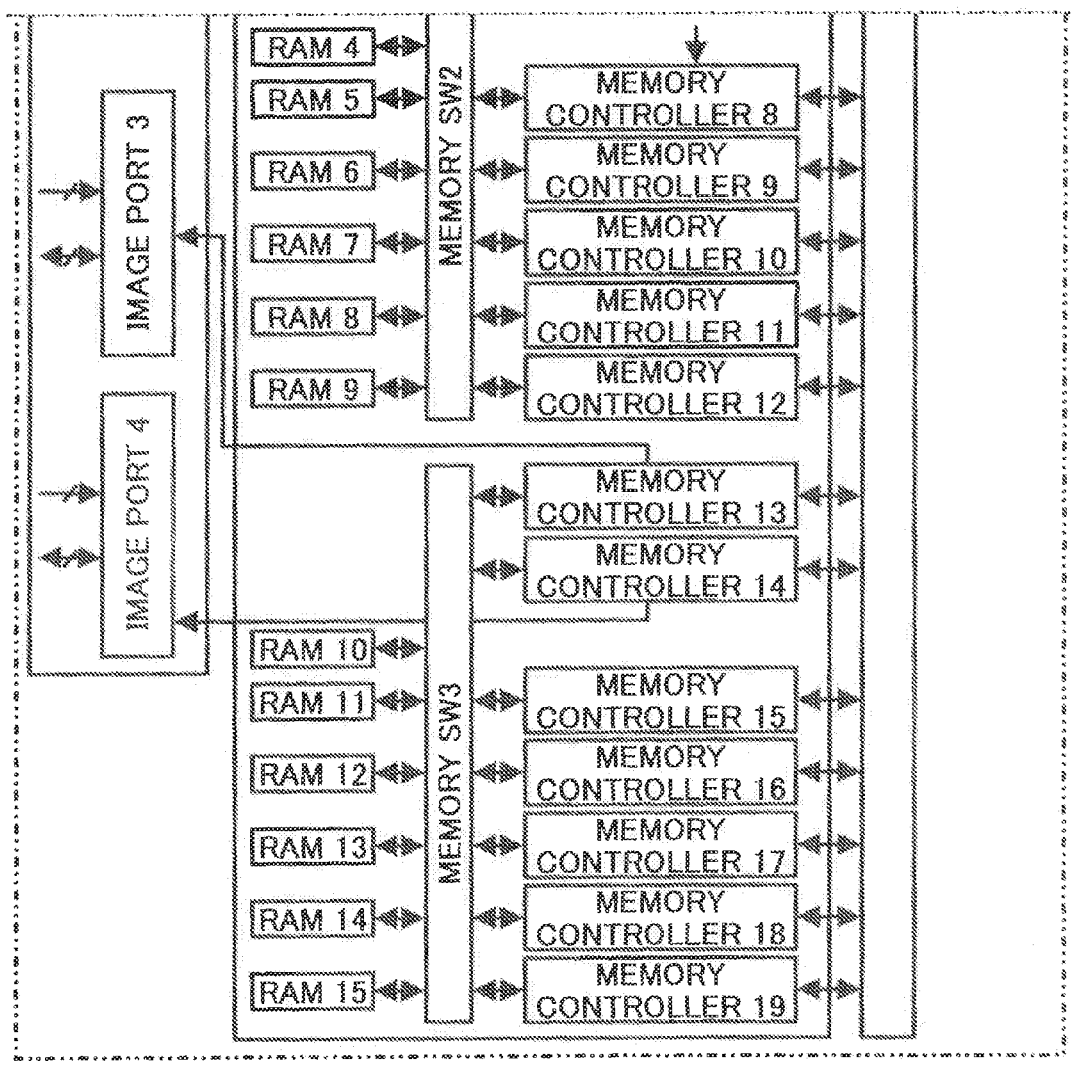

FIG. 6 depicts the configuration of the IPU 1. An input/output I/F 31 includes image ports 0 to 4 that input or output image data, a mode setter (mode specifying decoder) that transfers control data, control signals or sync signals, a system control interface (SCI), an interrupt controller, a JTAG (circuit automatic test), a host I/F, a clock generator, and a timer. The image ports 0 and 1 are exclusive for input of the image data, the image port 2 is for input and output of image data, and the image ports 3 and 4 are exclusive for output.

The respective image ports 0 to 4 have a first port and a second port, and 1-byte data can be input or output at the same time by a first and a second port. Accordingly, the respective image ports 0 to 4 can input or output 2-byte data concurrently. The RGB color image data (multi-level tone) have 8 bits, and the read output data multi-level tone) when monochrome read (monochrome processing mode) is specified have also 8 bits. Therefore, at the time of the monochrome processing mode, two image data, that is, image data of 2 pixels can be input/output concurrently. At the time of color processing mode, two RGB image data of one pixel can be input/output concurrently.

RAMs 0 to 15, which are respective memories, in a buffer memory device 32 have, respectively, a memory capacity of 8 Kilobytes. The memory capacity of 8 Kilobytes can store multi-level image data (8 bits: one kind of R, G, B image data) of 600 dots per inch of one line parallel to a narrow side of A3 size, and is used as a line buffer for input and output of the image data, or is used as a look up table (LUT). There are 16 RAMs of this kind, which can respectively select read/write of 2 bytes in a batch or read/write of 1 byte each. Two RAMs 16 and 17 have respectively a capacity of 2 Kilobytes, and are used as a circular shift register that circularly shifts the image data for absorbing the speed difference in serial data transfer with an image data sender or an image data receiver.

These RAMs 0 to 17 are connected to any one of memory switches SW1 to SW3. Memory controllers 0 to 17 are respectively inserted between the image ports 0 to 4, the memory switches SW1 to SW3, and a SIMD type processor 33. The memory controllers 0 to 5, 11, and 12 connected to the respective image ports 0 to 4 have a data input/output function with respect to the image ports, according to the input/output mode specified by the SIMD type processor 33. The image ports and the SIMD type processor 33 or the RAMs (0 to 17) are the sender side of the data transfer with respect to the memory controllers, and are also the receiver side of data transfer.

Other memory controllers 6 to 10, and 13 to 19 have a data select function for determining the data transfer direction (From/To), according to the input/output mode specified by the SIMD type processor 33, and with respect to these memory controllers, the SIMD type processor 33 or the RAMs (0 to 17) become the sender side of the data transfer, and also become the receiver side of data transfer. However, there is no connection function with respect to the image ports. All memory controllers 0 to 19 are set the memory switches (SW1 to SW3) to connect the own memory controller to the specified RAM (0 to 17), according to the RAM specified by the SIMD type processor 33.

The respective memory controllers 0 to 19 include a setting information register that stores memory controller setting information provided by the SIMD type processor 33, a management information register that stores management information of connection destination RAMs (0 to 17) specified by the SIMD type processor 33, and a direct memory access controller (DMAC). The DMAC includes an address counter that determines a read/write address of the connection destination RAMs (0 to 17), a start address register (latch), an end address register, a use mode register, and a memory input/output control circuit. These start address register (latch), end address register, and use mode register can respectively store a plurality of kinds of information, so that start addresses, end addresses, and the use mode (buffer memory/LUT) addressed to the respective regions in a plurality of regions in the RAM can be held. The memory input/output control circuit includes a decoder that decodes the data groups in the setting information register and the management information register, to generate a control signal and a timing signal to the receiver side, synchronously with the timing signal on the sender side in the data transfer. Furthermore, the 8 Kilobyte RAMs 0 to 15 respectively include a ½ frequency divider that divides frequency of pixel synchronous pulses to ½, for generating an even (or odd) pixel synchronizing signals used for respective data processing, that is, separation of 1-line data into odd pixel data and even pixel data, or on the contrary, compilation to 1-line data of the odd pixel data and the even pixel data.

When data is read from or written to the buffer memory RAM (0 to 17), the decoder in the memory input/output control circuit compares a count value (pixel address) of the pixel synchronizing pulse in the address counter with the data in the start address register and the end address register, to detect the current RAM access area, reads out the use mode data in the detected area from the use mode register, and decodes the use mode data to an operation mode control signal, to control read and write from/to the RAM (0 to 17).

When a certain RAMa (one of RAMs 0 to 17) to be connected to a certain memory controller A (one of memory controllers 0 to 19) is specified according to the memory controller setting information, and the "buffer memory" (write/read) is specified as the use mode, the memory controller A determines a data selector in the memory switch (SW1 to SW3) as a connection for the memory controller A to access the RAMa. In this case, for example, when read of input color image data is specified by the memory controller setting information, the color image data entering to the specified image port is written in the RAMa (0 to 17) specified by the processor 33.

Figure 7:
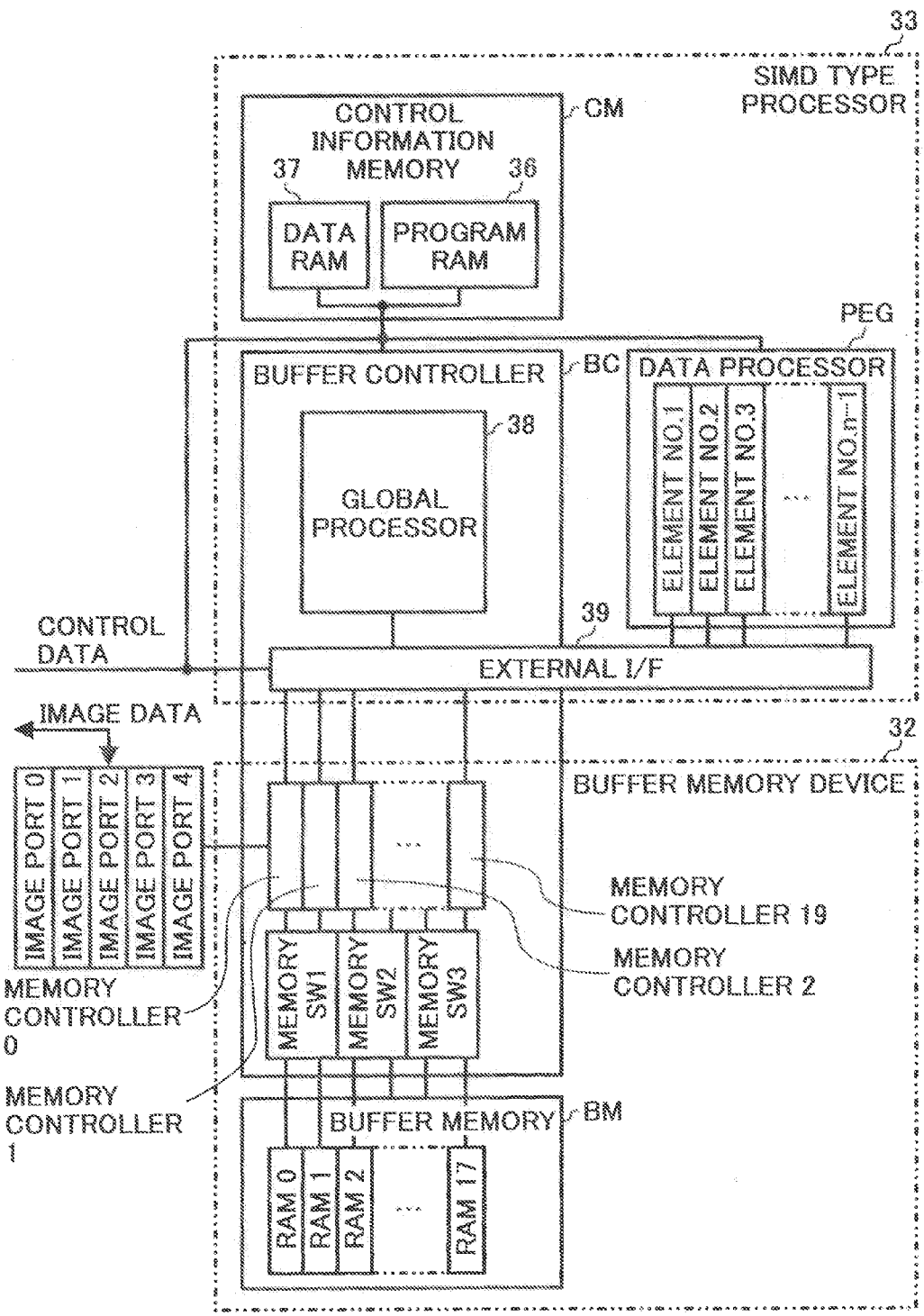
FIG. 7 is a block diagram of the outline of the hardware configuration of a Single Instruction Stream Multiple Data Stream (SIMD) processor shown in FIG. 6.

FIG. 7 depicts the outline of the configuration of the SIMD type processor 33 shown in FIG. 6. The SIMD type processor 33, which is a data processor, has therein a local memory RAM group in a category of processor element PE, and controls the memory area to be used and the route of the data bus in a data bus control in a global processor 38. The local memory RAM group is allocated as a buffer memory, and the input data and the data for output are stored in respective buffer memories, and output by an external I/F 39. The global processor network I/F 38 gives the same operation code at the same time to the processor element PE group, that is, the data processor PEG, which has local memory RAMs and performs the same image processing concurrently with respect to the multi-level image data of 8 bits or more. The operation result of the processor element PE is stored in the local memory RAMs, and output to the memory controllers through the external I/F 39.

The processing procedure and parameters and the like for the processing of the processor element PE are transferred between a program RAM 36 and a data RAM 37. Programs and data in the hard disk HDD are downloaded to the program RAM 36 and the data RAM 37 via the IMAC, the parallel bus Pb, the CDIC, and serial bus Sb in response to a command from the system controller 106. The data transfer is executed by a direct memory access controller (DMAC) in the external I/F 39, in response to a load command from the system controller 106. The data flow is set by a process controller 101, in response to a request from the DMAC.

The group of RAMs 0 to 17 serves as the buffer memories BM, and a buffer controller BC that reads and writes data from/to the buffer memories BM include the group of memory switches SW1 to SW3, the group of memory controllers 0 to 19, the external I/F 39, and the global processor 38. The buffer controller BC controls the data transfer among three units, that is, the group of image ports 0 to 4, the buffer memory BM, and the data processor PEG including the group of processor elements PE. The global processor 38 defines the data transfer mode among the three units based on the data program in the program RAM 36, and defines the content of the data processing performed by the data processor PEG.

The data programs in the program RAM 36 include the transfer mode data for defining the data transfer mode, and the processing mode data addressed to the data processor PEG. In a control stage (timing) when the transfer mode data is recognized (read), the global processor 38 decodes (deciphers) the transfer mode data to read low order control data (memory controller-specified data) for controlling (data selectors Ds20, Ds21 of) the external I/F 39 and control information data (setting information and management information) of the low order hierarchy to be provided to the memory controller specified by the low order control data, which are transfer mode data conformant, and provides these data to the external I/F 39 and to the memory controller via the external I/F 39.

In the control stage when the processing mode data is recognized, the global processor 38 decodes the data processing data to read the data processing program for the data processor PEG applied to the data processing mode, the reference data, and the setting data from the data RAM 37, and writes these in the internal RAM in each processor element PE in the data processor PEG. A control information memory CM formed of the program RAM 36 and the data RAM 37 stores the control information data in the buffer memory BM (RAM 0 to 17), and conversion data including a conversion table or the operation data.

The buffer memory BM can store data to be input one by one, output a predetermined number of the stored data to the data processor PEG at the same time, temporarily store a predetermined number of data processed by the data processor PEG, and output the processed data. The data processor PEG, which is a group of processor elements PE, inputs and processes the predetermined number of data in the buffer memory BM concurrently, or outputs the predetermined number of processed data concurrently. The buffer controller BC appropriately changes the connection between the buffer memory BM and the data processor PEG, so that the buffer memory BM has a shape suitable for the parallel input/output of the data processor (PEG), and forms a plurality of same conversion tables in the buffer memory (BM) based on the conversion data in the control information memory (CM).

Accordingly, after a part or the whole of the memory (any one of RAMs 0 to 17) in the buffer memory BM is set to a state suitable for the parallel input/output of the data processor (PEG), a predetermined number of data can be input concurrently from the buffer memory (BM) to the data processor (PEG) or the predetermined number of data processed by the data processor (PEG) can be concurrently output to the buffer memory BM. Alternatively, respective series of data to be converted are associated with the respective conversion tables formed in the buffer memory BM, and converted data corresponding to the respective series of data to be converted are concurrently read from the respective conversion table, or the both processing are performed.

When the content of the image processing is to be changed, or the processing mode (combination of the image processing) required in the system is to be changed, the selection of the data set to be transferred from the HDD to the program RAM 36 and the data RAM 37 by the system controller 106 is changed according to an instruction from the operation board OPB or the personal computer PC. The data set to be transferred from the HDD to the program RAM 36 and the data RAM 37 can be rewritten.

Figure 17A:
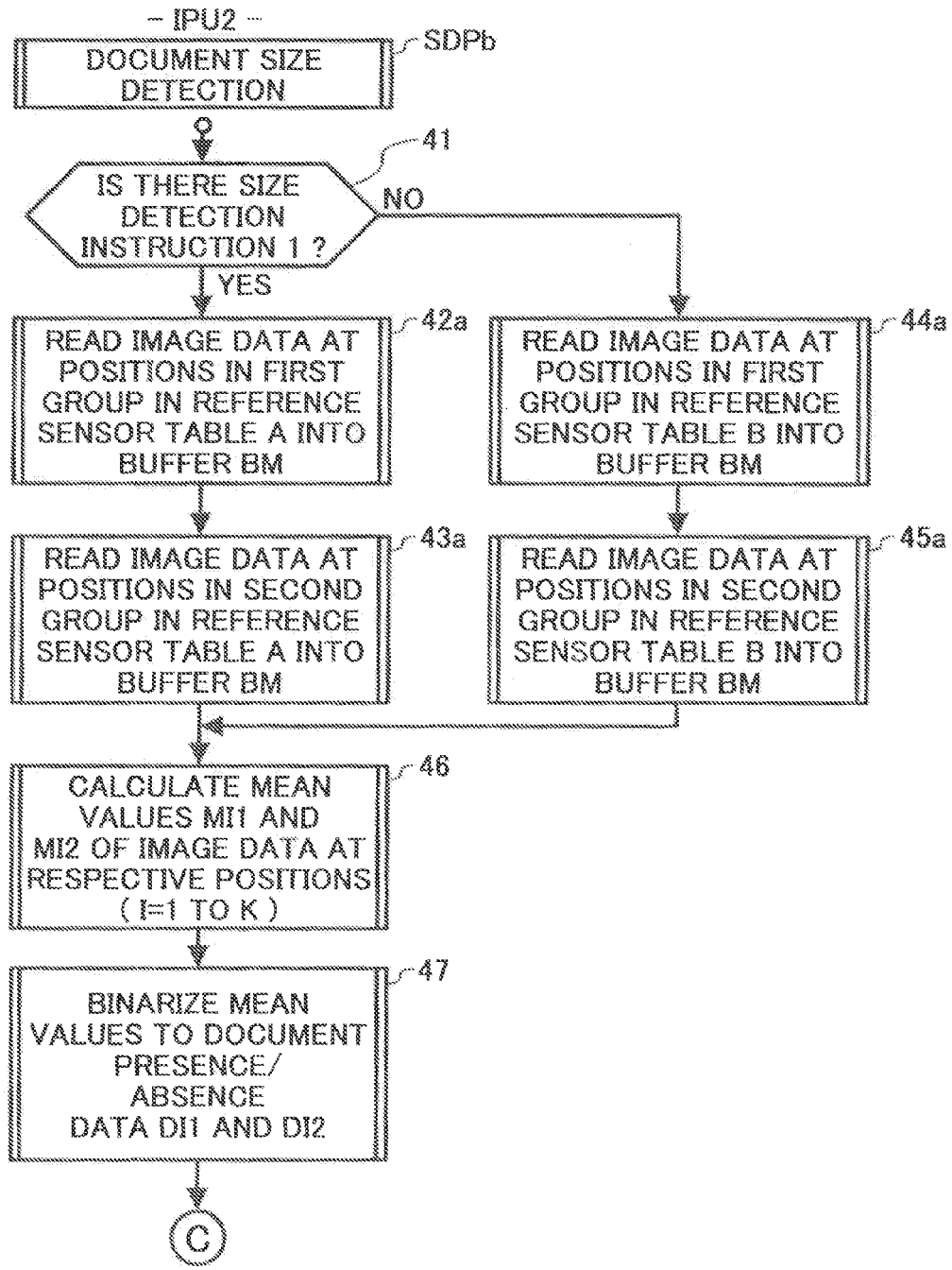
FIG. 17 is a flowchart of the content of "document size detection" (SDPb) by an IPU according to the third embodiment of the present invention.
Figure 17B:
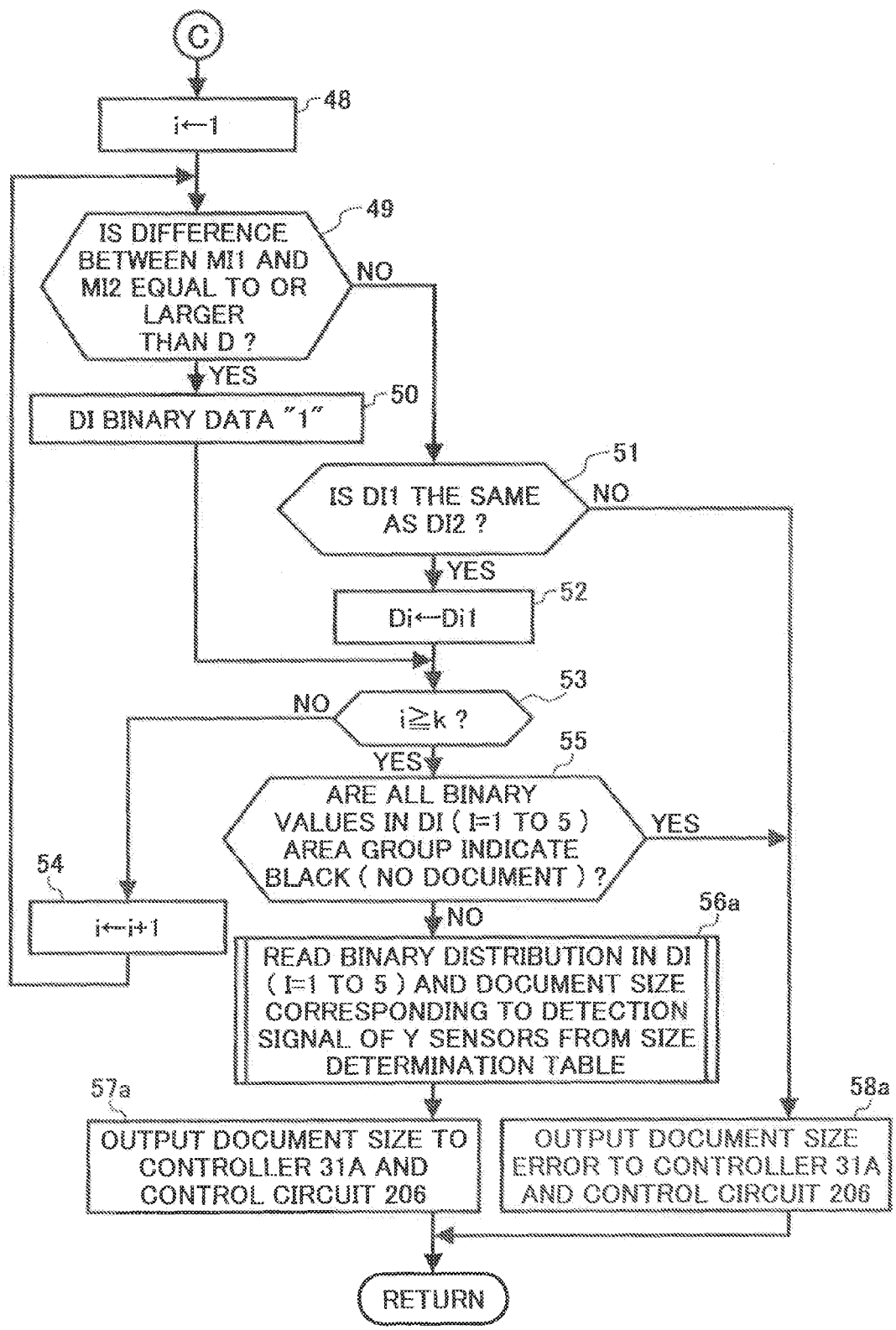

The RAM in each processor element PE in the processor element group (PEG: FIG. 17), which is the data processor, is connected to the input/output bus in the external I/F 39, and the global processor 38 sets read/write DMA transfer of the RAM in each element PE to the memory controller, to write the data in the RAM in each element PE from outside of the SIMD type processor 33, or the data can be read from the RAM in each element PE to the outside of the SIMD type processor 33. In other words, data transfer is possible between the image ports 0 to 4, the RAMs 0 to 17, and the processor element group (PEG) in the SIMD type processor 33 shown in FIG. 6. One line of the data line between the RAMs 0 to 17 and the SIMD type processor 33 means one set of buses capable of transferring 8-bit data in bit-parallel.

When the use mode of the RAM is generation of the LUT, and the memory controller setting information is for generating a shading LUT (writing the LUT data in the RAM), the memory controller B (one of memory controllers 0 to 19) writes the shading correction data provided by the SIMD type processor 33 in the address (start address to end address) specified by the processor 33, of the RAMb (one of the RAMs 0 to 15) specified by the specified 33.

When the mode specified by the memory controller setting information is transmission of color image data, the color image data output by the processor SIMD type processor 33 or in a RAMe (one of RAMs 0 to 15) specified by the processor SIMD type processor 33 is transmitted to the image port. The specified modes include shading correction 210, document size detection 211, pixel density conversion 212a, and scaling 212b, and the like, as well as write of color image data in the RAM (0 to 17) and readout of color image data from the RAM (0 to 17), which performs parallel/serial conversion or serial/parallel conversion. The programs and data for these kinds of processing are all stored in the HDD, and (the global processor 38) in the IPU 1 reads out the programs and data from the HDD via the system controller 31a and the IMAC and stores these in the control information memory CM, at the time of initialization executed when the power of the scanner 210 is turned on and the operating voltage is applied to the global processor 38.

In the scanner control circuit 206, there is a microcomputer including the CPU, the ROM, and the RAM, and main control is performed by the microcomputer. When the power of the scanner 210 is turned on, and the operating voltage is applied to the scanner control circuit 206, (the CPU) of the scanner control circuit 206 initializes the scanner 210 and the ADF 230. When this processing is finished and the IPU 1 finishes the initialization, the scanner control circuit 206 forms the shading correction LUT in (a part of the RAMs 0 to 17) in the buffer memory device 32 in the IPU 1. In other words, when the lamp 232 is lighted up and adjusted to predetermined brightness, and the brightness of the lamp 232 is stabilized at a certain level, the scanner control circuit 206 drives the first carriage (the lamp 232 and the first mirror 233) to the position of the reference whiteboard 239, and instructs (the global processor 38 in) the IPU 1 to generate the shading correction LUT via the signal processing timing control circuit 213. In response to this instruction, the IPU 1 reads several lines of the image data obtained by converting the image signal line-read by the CCD 207 to digital data in the A/D conversion 209, to calculate a mean value of the image data at the same x position in the main-scanning direction, and calculate respective gains required for making the image data (mean value) at the respective pixel positions (x positions) on one horizontal scanning line a set level, and writes the respective gains at the respective pixel positions (x position) in the shading correction LUT defined in (a part of the RAMs 0 to 17 of) the buffer memory device 32 in the IPU 1. When read of the reference whiteboard 239 has finished, the scanner control circuit 206 turns off the lamp 232, and returns the first carriage to the home position HP.

Figure 8:
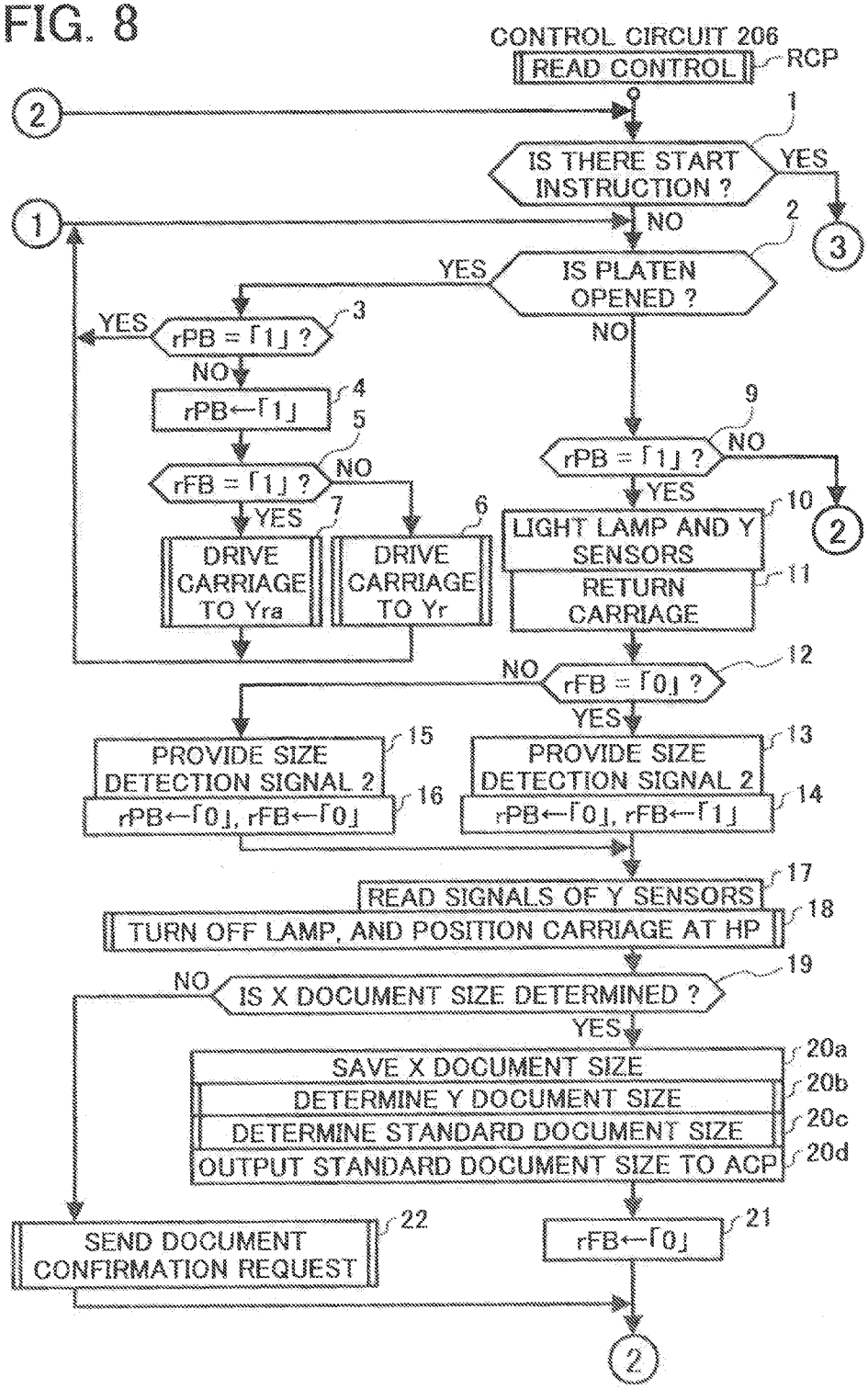
FIG. 8 is a flowchart of a part of the outline of a content of "read control" (RCP) of a scanner control circuit shown in FIG. 5.
Figure 9:
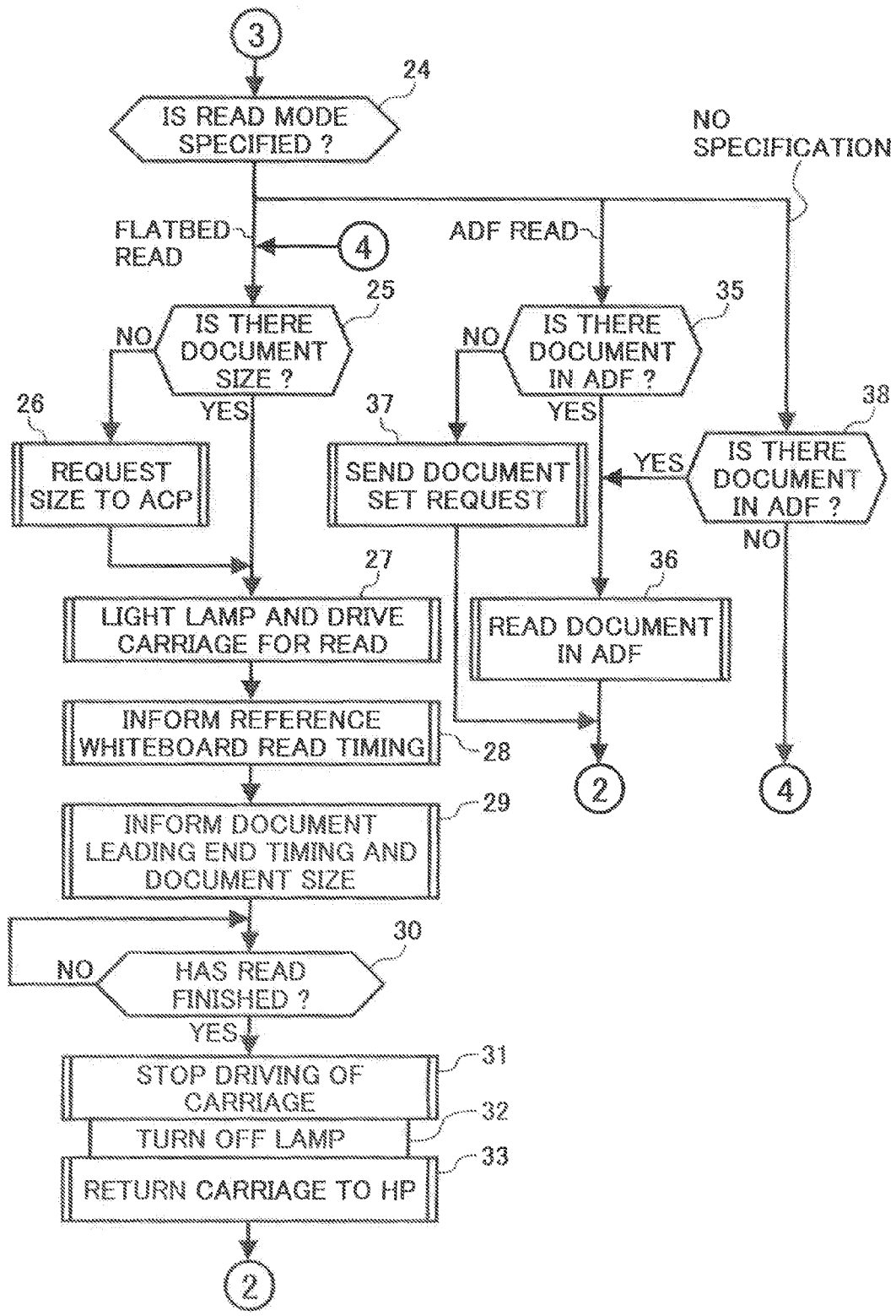
FIG. 9 is a flowchart of other parts of the outline of the content of "read control" (RCP) of the scanner control circuit shown in FIG. 5.

FIGS. 8 and 9 depict the outline of the document read control (RCP) by the scanner control circuit 206. First, reference is made to FIG. 8. When a user raises the ADF 230, the platen 250p is separated from the contact glass 231. When the ADF 230 inclines (opens) approximately by 20 degrees or more with respect to the contact glass 231, the detection signal of the platen opening degree detection switch 252 (FIG. 3) is changed from L (close) to H (open). In response thereto, the scanner control circuit 206 writes "1" indicating "platen open" in the register (one area in the internal RAM of the CPU in the scanner control circuit 206) rPB (step S4), and drives the first carriage having the lamp 232 and the first mirror 233 mounted thereon forward to a first return position Yr in the sub-scanning direction y (steps S1 to S6: the second carriage synchronizes therewith, but the speed is half the speed of the first carriage). At step S5, it is referred whether the data in the register rFB is "1" indicating that first read of the document size has finished (first detection of the document size is failed). The data in the register rFB is operated (changed) at steps S14, S16, and S21 (described later).

The register rPB holds the detection signal ("1" (H): open, "0" (L) close) of the platen opening degree detection switch 252, and the scanner control circuit 206 writes the detection signal every time having read the detection signal. When the scanner control circuit 206 has read the detection signal, and the level ("1"/"0") is different from the data in the register rPB, it can be seen that the state of the platen has changed from close to open, or vice versa, immediately before read of the detection signal. That is, when the data in the register rPB is "0", and the detection signal of the platen opening degree detection switch 252 is "1", it can be seen that the state of the platen 250p has changed from close to open, that is, the platen is opened. When the data in the register rPB is "1", and the detection signal of the platen opening degree detection switch 252 is "0", it can be seen that the state of the platen 250p has changed from open to close, that is, the platen is closed. The route at steps S2-3-4-5 is a route for detecting that the state of the platen 250p has changed from close to open, and the route at steps S2-9-10 is a route for detecting that the state of the platen 250p has changed from open to close.

In response to the change of the state of the platen 250p from close to open, when the first carriage is driven forward to the first return position Yr in the sub-scanning direction y, the contact glass read position by the first mirror 233 is a position shown by thick one-dot chain line in FIG. 11, which, in this embodiment, is the point side (an original point O side in the sub-scanning direction y) than the rear end in the vertical direction of a "business card" having the smallest size in the standard document sizes to be detected, and does not interrupt nor cross any field of vision of the reflecting type optical sensors Sy1 to Sy6 for detecting the document size in the sub-scanning direction y. The positions for extracting the image data line-read by the CCD 207 for the detection of the document size in the main-scanning direction x are in two groups of areas B01 to B51 and B02 to B52 shown in FIG. 11, and the positions in the main-scanning direction x of the respective areas B02 to B52 in the second group are the same as the positions in the main-scanning direction of the respective areas B01 to B51 in the first group. When paper larger than the size of the business card (the smallest standard size) is placed with a corner matched with the original point O, the positions B01 and B02 close to the original point O (reference points) are the areas where the paper is present, and the next two positions B11 and B12 are located outside of the business card approximately adjacent to the long side thereof, when the short side of the business card is put parallel to the main-scanning direction x and the corner is matched with the original point O. Likewise, B21 and B22 are located outside of a postcard arranged vertically, approximately adjacent to the long side thereof, B31 and B32 are located outside of a B5 sheet arranged vertically, approximately adjacent to the long side thereof, B41 and B42 are located outside of a B4 sheet arranged vertically, approximately adjacent to the long side thereof, and B51 and B52 are located outside of an A3 sheet arranged vertically, approximately adjacent to the long side thereof.

With reference to FIG. 8 again, when the first carriage is positioned at the first return position Yr, the scanner control circuit 206 waits until the detection signal of the platen opening degree detection switch 252 is changed from "1" (H: open) to "0" (L: close) (steps S1, 2-9-1, 2-9), and when the detection signal has changed, the scanner control circuit 206 lights up the lamp 232 and laser diodes of the reflecting type optical sensors Sy1 to Sy6 (hereinafter, "Y sensors") (step S10), drives backward (returns) the first carriage (step S11), and provides a "size detection instruction 1" to the IPU 1 via the signal processing timing control circuit 213 (steps S12 and 13). The scanner control circuit 206 then writes "1" indicating that first read of document size has finished in the register rFB (step S14). In response to the "size detection instruction 1", the IPU 1 performs read of the line-read image signal generated repetitively by the CCD 207 and X document size detection. The contents thereof will be described later with reference to FIG. 10.

The scanner control circuit 206 then writes "0" indicating that the platen is closed in the register rPB, and "1" indicating that first document size detection has finished in the register rFB (step S14), and reads the detection signals of the Y sensors (Sy1 to Sy6) (step S17). When the reading field of vision of the first carriage is away from the leading end (the original point O in FIG. 11) of the contact glass 231, the scanner control circuit 206 turns off the lamp 232, and stops the first carriage at the home position (standby position) HP (step S18).

When the completion of X document size detection (X document-size data ready) is informed by the IPU 1, the scanner control circuit 206 receives the X document-size data and saves the data in the register (step S20a), determines the Y document size based on the detection signals of the Y sensors (Sy1 to Sy6) read at step S17 to generate Y document-size data (step S20b), determines the entire size of the document to any one of the standard document sizes based on the X document-size data and the Y document-size data (step S20c), and outputs the determined standard document-size data to (the system controller 31a in) the ACP (step S20d). The ACP determines the area to be processed in the document image data processing executed therein to the determined standard document size. In the case of copy mode, the ACP determines a required sheet size from the standard document size and the specified copying magnification, and sets the sheet of the size to the printing paper feed.

When the X document-size data is obtained, the scanner control circuit 206 deletes "1" indicating that the first document size detection has finished in the register rFB (step S21). That is, the scanner control circuit 206 writes "0" in the register rFB. Accordingly, when the platen 250p is opened next time, the first carriage is driven to the first return position Yr (steps S5-6).

However, when the IPU 1 informs a failure in X document size detection, the scanner control circuit 206 instructs the operation board 220 to display a document confirmation request via (the system controller 31a in) the ACP (step S22). The operation board 220 displays "please open the platen and place the document" allocated to the document confirmation request on a display panel on the operation board 220, and sounds a buzzer equipped on the operation board 220 intermittently three times. The scanner control circuit 206 then returns to the operation read of the platen 250 (steps S1-2-3-2). At this time, it should be noted that the data in the register rFB is "1".

When the platen 250p is opened, the scanner control circuit 206 drives the first carriage forward to a second set position Yra in the sub-scanning direction y (steps S1 to S5-7). When the first carriage is driven forward to the second set position Yra in the sub-scanning direction y, the contact glass read position by the first mirror 233 is a position indicated by thick one-dot chain line in FIG. 12, which is a position forward from the first return position Yr (further inward into the smallest size (business card) area). The positions for extracting the image data line-read by the CCD 207 for the detection of the document size in the main-scanning direction x are in two groups of areas B01 to B51 and B02 to B52 shown in FIG. 12, and the positions in the main-scanning direction of the respective areas B02 to B52 in the second group are the same as the positions in the main-scanning direction x of the respective areas B01 to B51 in the first group. As in the arrangement shown in FIG. 11, B01 and B02 are in the area of the smallest size (business card), but B11 to B51 and B12 to B52 are positions corresponding to the outside of the rear edge in the main-scanning direction x of the respective standard sizes (business card, postcard, B5 horizontal, B4 horizontal, and A3 horizontal (A4 vertical). However, the read positions B01 to B51 and B02 to B52 for detecting the X document size for the second time shown in FIG. 12 are different from those for the first time shown in FIG. 11, with respect to the contact glass face and the set position (Yra) for starting return scanning.

At the set positions (Yr, Yra) in the sub-scanning direction, the lamp 232 is lighted up, as well as the first carriage is returned and driven backward, and the field of vision of the first mirror 233 on the first carriage until the first carriage is returned to the home position HP fetches the image data in the areas at the respective positions B01 to B51 and B02 to B52, for determination of the X document size. Therefore, according to the combination of tightness of the rise of luminous energy of the lamp 232, the closing speed of the platen, and the image density distribution on the document, it is considered that the image read conditions can become unsatisfactory at the positions B01 to B51 and B02 to B52. Accordingly, two kinds of set positions (Yr, Yra) and read positions are set (FIGS. 11 and 12), and if the first X document size detection (FIG. 11) is failed, the second X document size detection (FIG. 12) is executed at the different set position and read position.

After driving the first carriage to the second set position Yra in the sub-scanning direction y, when the platen 250p is changed to "close", the scanner control circuit 206 lights up the lamp 232 and the laser diode of the Y sensors (step S10), drives backward (returns) the first carriage (step S11), and provides a "size detection instruction 2" to the IPU 1 via the signal processing timing control circuit 213 (steps S12 and 15). The scanner control circuit 206 then writes "0" indicating that the platen is closed in the register rPB, and deletes "1" indicating that first document size has been detected in the register rFB and changes to "0" (step S16). The scanner control circuit 206 then reads the detection signal of the Y sensors (Sy1 to Sy6) (step S17), and when the reading field of vision of the first carriage is separated from the leading end (the original point O in FIG. 12) of the contact glass 231, turns off the lamp 232, and stops the first carriage at the home position HP (step S18). The processing of the scanner control circuit 206 thereafter is the same as the first X document size determination processing (steps S19 to 22).

With reference to FIG. 9, when a start instruction of document image read comes from the ACP, the scanner control circuit 206 refers to the read mode data attached to the start instruction (step S24), and when the flatbed read mode is specified, executes flatbed read at steps 25 to 33. That is, when the standard document size is determined and held, the scanner control circuit 206 lights up the lamp 232 to start driving of the first carriage forward (steps 25, 27), when the first carriage enters into the read area of the reference whiteboard 239, outputs a reference whiteboard read timing signal to the IPU 1 via the signal processing timing control circuit 213 (step S28), and when the first carriage reaches the original point O for the document read, outputs a document start end timing signal and the document-size data to the IPU 1 (step S29). When the vertical scanning position of the first carriage passes the rear end of the standard document size, the scanner control circuit 206 stops the forward drive of the first carriage (step S31), turns off the lamp 232 (step S32), drives (returns) the first carriage backward, to return the first carriage to the home position HP (step S33).

When the standard document size is not held by the scanner control circuit 206, and is not included in the read mode data attached to the start instruction, the scanner control circuit 206 requests the document size to the ACP. In response to this request, the ACP displays "please input the read size" on the operation board 220, and upon input of the size, transmits the size to the scanner control circuit 206. Upon reception of the size, the scanner control circuit 206 lights up the lamp 232, to start forward drive of the first carriage (steps 25, 27).

When the read mode data specifies the ADF read mode, the scanner control circuit 206 refers to the detection signal of the paper sensor 223 on the document tray 241, and when the detection signal indicates the presence of paper, lights up the lamp 232 to start feeding of the document by the ADF 230, to read the document by the ADF 230 (steps 35, 36). When the detection signal of the paper sensor 223 indicates absence of paper, the scanner control circuit 206 requests the ACP to set (place) the document (step S37). In response thereto, the ACP displays "please set the document on the document tray" on the operation board 220. When the read mode data does not specify the mode, the scanner control circuit 206 refers to the detection signal of the paper sensor 223 on the document tray 241, and when the detection signal indicates the presence of paper, reads the document by the ADF (steps 38, 36). When the detection signal indicates absence of paper, the scanner control circuit 206 executes flatbed read (steps S38-25).

Figure 10B:
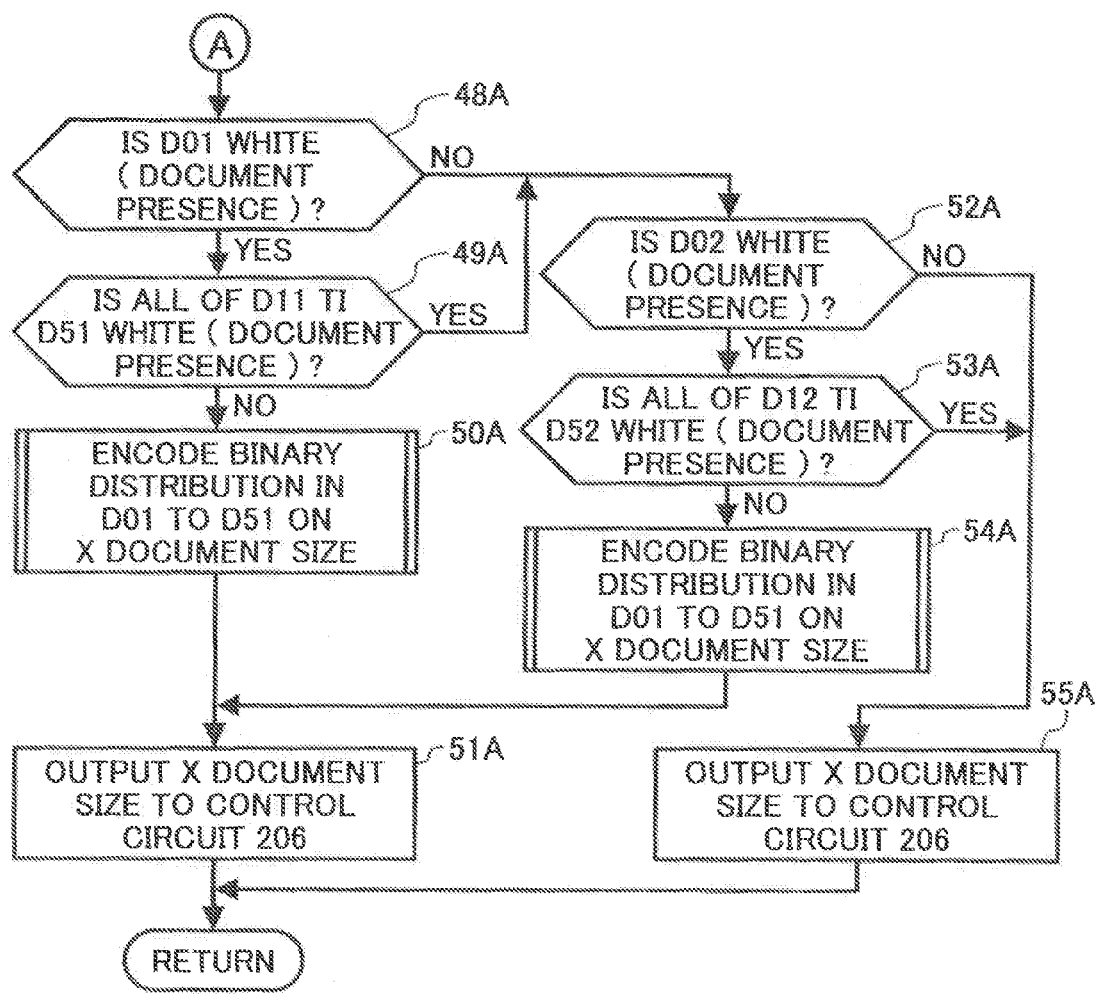
FIG. 10 is a flowchart of the content of "X document size detention" (SDP) by the IPU shown in FIG. 5.

FIG. 10 depicts the content of "X document size detection" (SDP) by the IPU 1 responding to the "size detection instruction 1" (step S13) and the "size detection instruction 2" (step S15). Upon reception of the "size detection instruction 1" (step S13), the IPU 1 refers to the frame gate signal FGATE, the line synchronizing signal LSYNC, and the pixel synchronizing clock pulse CLK generated by the signal processing timing control circuit 213, to write the respective image data at the read positions B01 to B51 and B02 to B52 shown FIG. 11 in the respective RAMs 8 to 17 associated with the respective points in the buffer memory BM (steps S41 to 43). Upon reception of the "size detection instruction 2" (step S15), the IPU 1 writes the respective image data at the read positions B01 to B51 and B02 to B52 shown FIG. 12 in the respective RAMs 8 to 17 associated with the respective points in the buffer memory BM (steps S41, 44, 45).

The IPU 1 performs shading correction with respect to the image data stored in the respective RAMs 8 to 17, to calculate mean values M11 to M51, M12 to M52 of the shading-corrected image data (mean values at the respective points) and save these values in the register (step S46), binarizes the respective mean values to document presence/absence data D11 to D51, D12 to D52, and saves these data in the register (step S47). The shading correction is for providing the pixel position (x position) of the image data to be corrected to the shading correction LUT, and reading a gain stored in the LUT for the x position, to multiply the image data to be corrected by the gain.

When the content of the binary data at D01 (position B01) indicates that there is no document (black) (step S48A), since there is the possibility of no document or before the rise of luminous energy of the illumination (insufficient illumination), the IPU 1 stops the document size determination in the X direction by detecting the reflected light amount at the positions B01 to B51 in the first group, and proceeds to document size determination in the X direction by detecting the reflected light amount at the positions B02 to B52 in the second group (steps S52A to 55A). When the content of the binary data at D01 (position B01) indicates presence of document (white), there is the possibility of detecting a document. Furthermore, when all the contents of the binary data at D11 to D51 (positions B11 to B51) indicate presence of document (white) (step S49A), the document size determination in the X direction is not possible. Therefore, the IPU 1 proceeds to document size determination in the X direction by detecting the reflected light amount at the positions B02 to B52 in the second group (steps S52A to 55A). When any content of the binary data at D11 to D51 (positions B11 to B51) indicates no document (black), X document size detection has succeeded. Therefore, the IPU 1 encodes the distribution in the main-scanning direction of binary data in the binary data groups D01 to D51 to X document-size data (step 50A), and transmits the X document-size data to the scanner control circuit 206 (step S51A).

When the IPU 1 stops the document size determination in the X direction by detecting the reflected light amount at the positions B01 to B51 in the first group, and proceeds to document size determination in the X direction by detecting the reflected light amount at the positions B02 to B52 in the second group (steps S52A to 55A), and when the binary data at D02 (position B02) indicates no document (black), there is the possibility of no document or before the rise of luminous energy of the illumination (insufficient illumination), and hence, the IPU 1 informs the scanner control circuit 206 of a failure in X document size detection (step S55A). When the binary data at D02 (position B02) indicates that there is a document (white), there is the possibility of detecting the document. Accordingly, when all the contents of the binary data at D12 to D52 (positions B12 to B52) indicate presence of document (white) (step S53), the document size determination in the X direction is not possible. Therefore, the IPU 1 informs the scanner control circuit 206 of a failure in X document size detection (step S55A). When any content of the binary data at D12 to D52 (positions B12 to B52) indicates no document (black), X document size detection has succeeded. Therefore, the IPU 1 encodes the distribution in the main-scanning direction of binary data in the binary data groups D02 to D52 on the X document-size data (step 54A), and transmits the X document-size data to the scanner control circuit 206 (step S51A).

Figure 14:
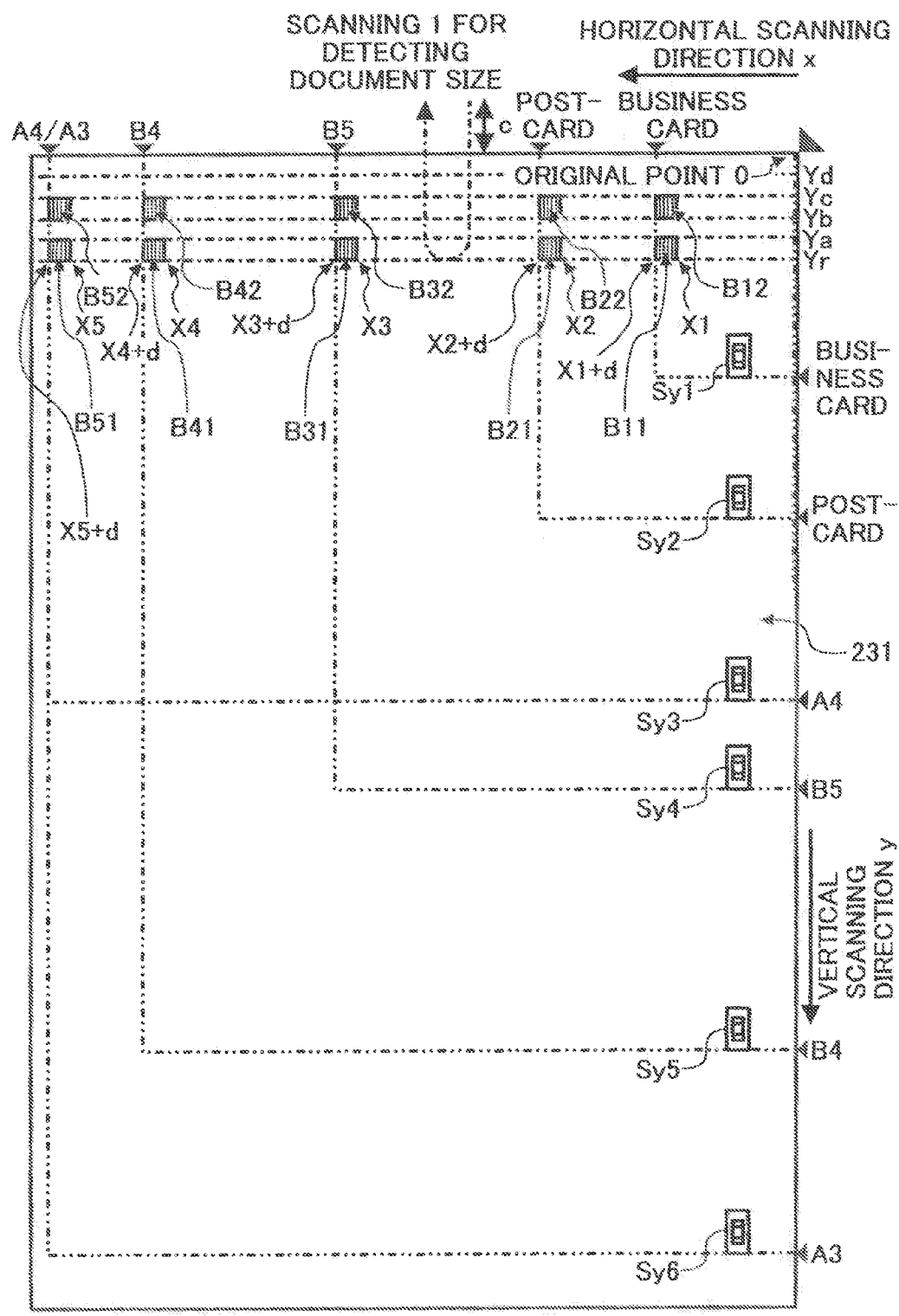
FIG. 14 is an enlarged plan view of the contact glass according to the second embodiment of the present invention, depicting points B11 to B51, and B12 to B52 at which image data is extracted by the first document size detection.
Figure 15:
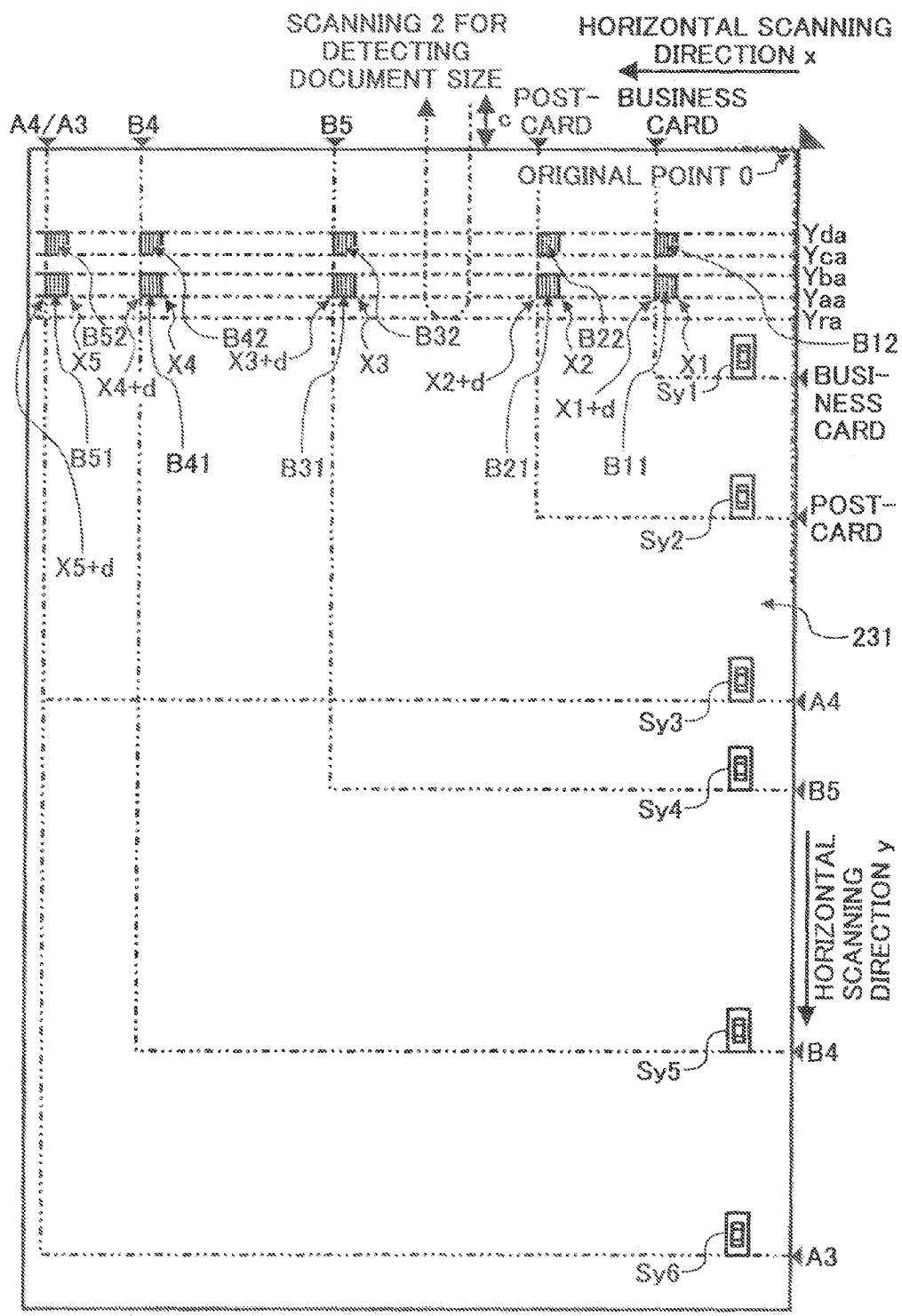
FIG. 15 is an enlarged plan view of the contact glass according to the second embodiment of the present invention, depicting the points B11 to B51, and B12 to B52 at which image data is extracted by a second document size detection.

While the outline of the hardware configuration according to a second embodiment of the present invention is similar to that of the first embodiment, there are some modifications, and the software (program) for detecting the document size is slightly different from that of the first embodiment. The different parts will be explained below. While the mechanism according to the second embodiment and the configuration of the image processing system are the same as those shown in FIGS. 1 and 7, the reflected light amount detection positions for detecting the document size are different from that of the first embodiment, as shown in FIGS. 14 and 15. The detection positions B11 to B51 in the first group and the detection positions B12 to B52 in the second group shown in FIG. 14 are positions where the IPU 1 according to the second embodiment detects the reflected light amount when having received the "size detection instruction 1" (step S13) and the "size detection instruction 2" (step S15). In the second embodiment, the detection positions B01 and B02 in the first embodiment are omitted, and all of B11 to B51 and B12 to B52 are set inside of the edge of the size to be detected.

The "read control" (RCP) by the scanner control circuit 206 according to the second embodiment is the same as that of the first embodiment shown in FIGS. 8 and 9. However, the "X document size detection" (SDPa) by the IPU1 according to the second embodiment is different from that of the first embodiment (FIG. 10).

Figure 13B:
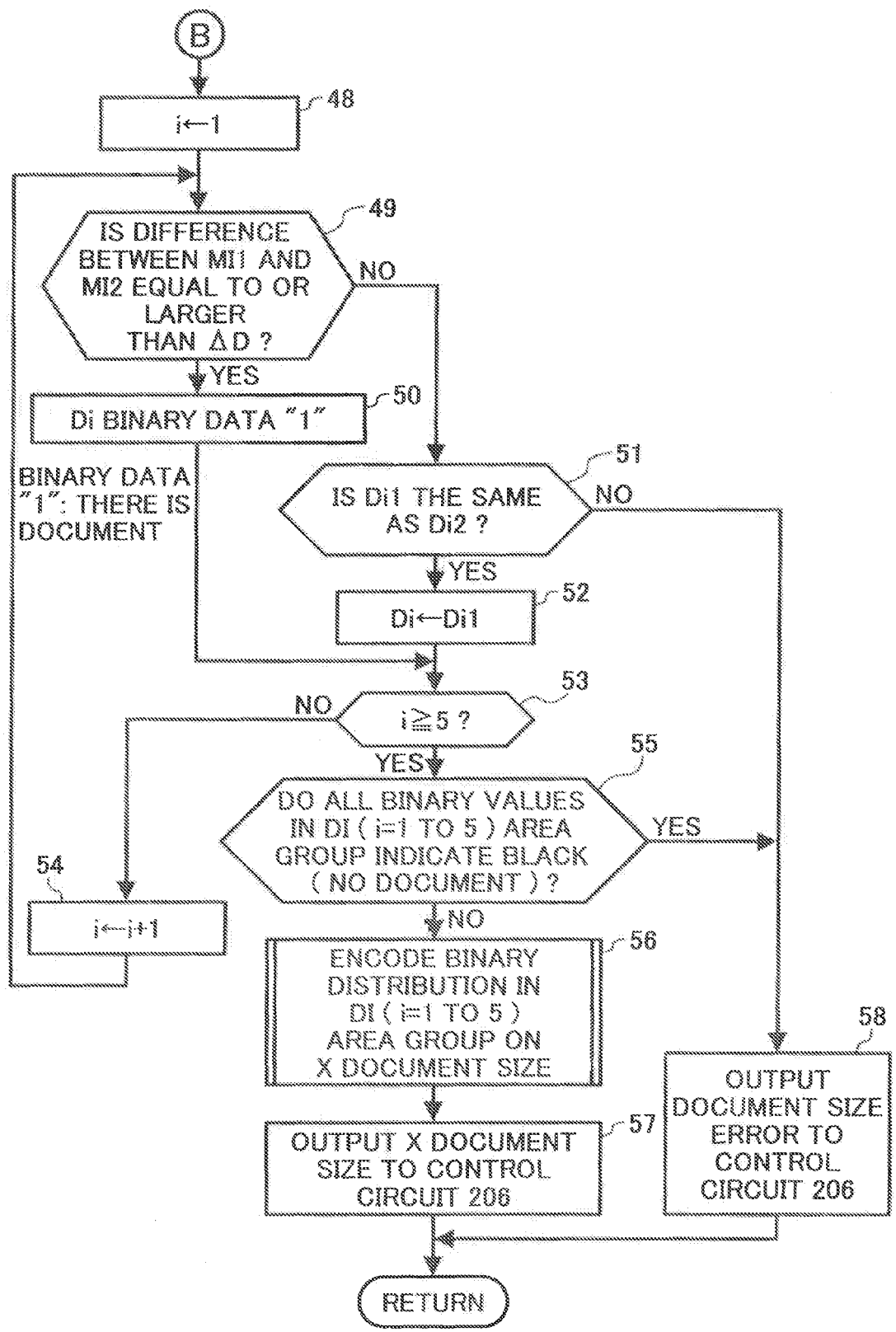
FIG. 13 is a flowchart of the content of "X document size detection" (SDPa) by the IPU according to a second embodiment of the present invention.

FIG. 13 depicts the content of the "X document size detection" (SDPa) by the IPU1 according to the second embodiment. Upon reception of the "size detection instruction 1" (step S13), the IPU 1 according to the second embodiment refers to the frame gate signal FGATE, the line synchronizing signal LSYNC, and the pixel synchronizing clock pulse CLK generated by the signal processing timing control circuit 213, to write the respective image data at the read positions B11 to B51 and B12 to B52 shown FIG. 14 in the respective RAMs 8 to 17 associated with the respective points in the buffer memory BM (steps S41 to 43). Upon reception of the "size detection instruction 2" (step S15), the IPU 1 writes the respective image data at the read positions B11 to B51 and B12 to B52 shown FIG. 15 in the respective RAMs 8 to 17 associated with the respective points in the buffer memory BM (steps S41, 44, 45).

The IPU 1 performs shading correction with respect to the image data stored in the respective RAMs 8 to 17, to calculate mean values M11 to M51, M12 to M52 of the shading-corrected image data (mean values at the respective points) and save these values in the register (step S46), binarizes the respective mean values to document presence/absence data D11 to D51, D12 to D52, and saves these data in the register (step S47). The shading correction is for providing the pixel position (x position) of the image data to be corrected to the shading correction LUT, and reading a gain stored in the LUT for the x position, to multiply the image data to be corrected by the gain.

The IPU 1 then calculates a difference between the mean values Mi1 and Mi2 (i=1 to 5) at the same position in the main-scanning direction, and sets "1" indicating that there is a document to the binary data Di (i=1 to 5) applied to the horizontal scanning position i, having a difference equal to or larger than a set value ΔD (steps S49, 50). With respect to the positions having a difference less than the set value ΔD, if Di1 and Di2 are the same, the IPU 1 writes the binary data Di1 at the position in the binary data Di applied to the position i (steps 51, 52). If Di1 and Di2 are not the same, the IPU 1 informs the scanner control circuit 206 of a failure to detect the X document size (step S58). In response thereto, the scanner control circuit 206 performs processing as explained relating to step S19 in FIG. 8. When the binary data is written in all Di (i=1 to 5), the IPU 1 informs the scanner control circuit 206 of a failure to detect the X document size, also when all binary data indicate "0" (black: no document) (steps 55 to 58). Otherwise, the IPU 1 encodes the distribution in the main-scanning direction of "1/0" of the binary data group Di (i=1 to 5) on the X document-size data and transmits the X document-size data to the scanner control circuit 206, assuming that detection of the X document size is successful (steps S56, 57).

Other hardware and functions according to the second embodiment are the same as those of the first embodiment.

While the outline of the hardware configuration according to a third embodiment of the present invention is similar to that of the second embodiment, there is a small modification, and the software (program) for detecting the document size is slightly different from that of the second embodiment. While the mechanism according to the third embodiment and the configuration of the image processing system are the same as those shown in FIGS. 1 to 7, in the third embodiment, the IPU 2 detects the document size. The IPU 1 performs shading correction with respect to the image data required for this and outputs the data to the IPU 2, and the scanner control circuit 206 reads the detection signal of the Y sensors (Sy1 to Sy8) and outputs the detection signal to the IPU 2. Size detection by the IPU 1 (211 in FIG. 5) is omitted, and the IPU 1 does not detect the document size.

The standard sizes of paper commonly used are largely or slightly different in each country or in each region. Therefore, a document reading apparatus in which the document presence detecting positions are designed matched with the general standard size group in the place of destination (in the used area) is required. However, it reduces the production efficiency of the document reading apparatus to manufacture the document reading apparatus adjusted to a plurality of places of destination. Therefore, in the third embodiment, after the document reading apparatus is manufactured, document size detection adjusted to the standard size group in the place of destination or to the standard size group desired by the user is selected and set.

Figure 19:
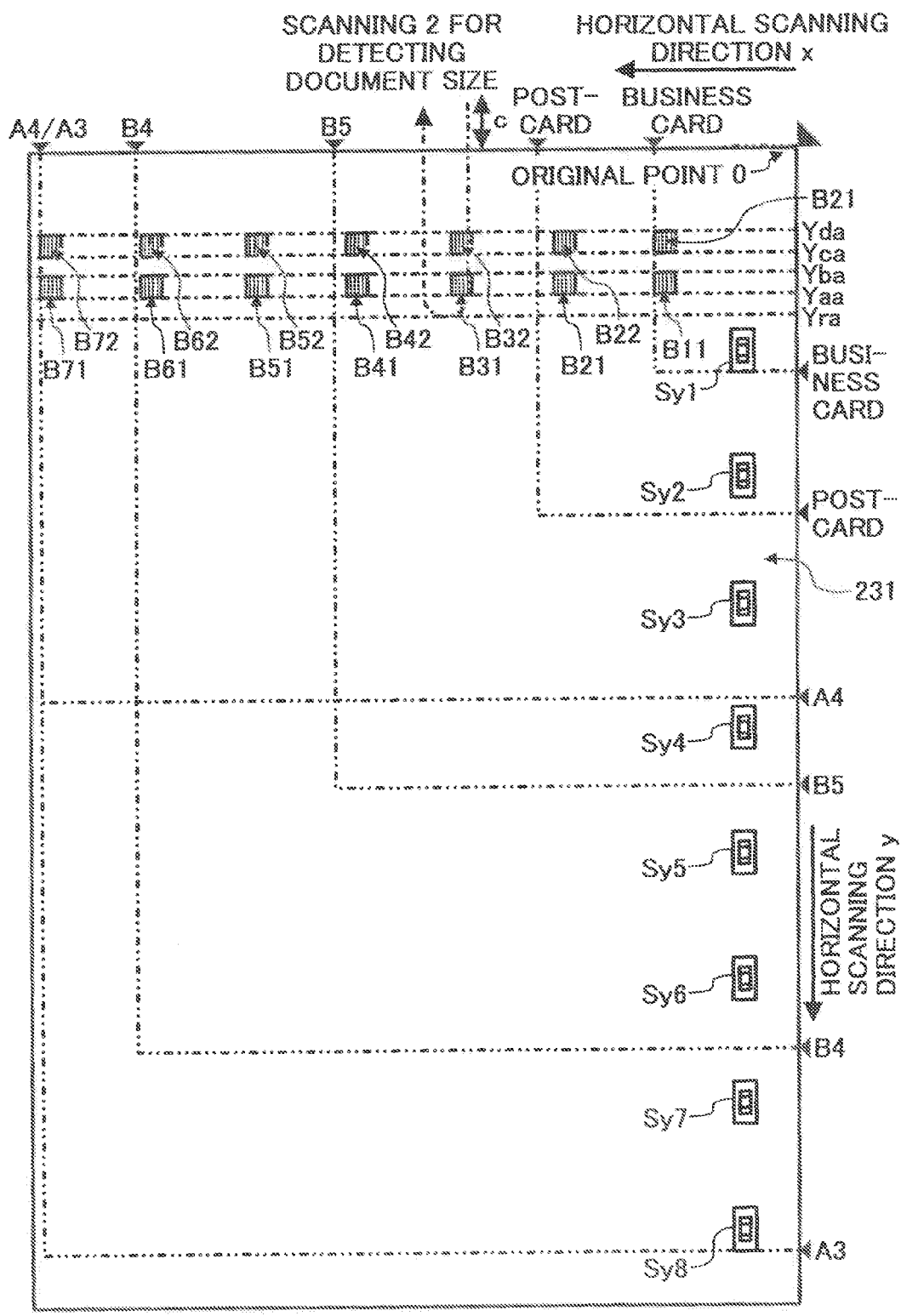
FIG. 19 is an enlarged plan view of the contact glass according to the third embodiment of the present invention, depicting the points B11 to B71, and B12 to B72 at which image data is extracted by the second document size detection.

Image data read position candidates B11 to B71, B12 to B72 and Y sensor candidates (Sy1 to Sy8) are set or installed, as shown in FIGS. 18 and 19, so as to be able to detect the standard document size in any one of the standard size groups. FIG. 18 depicts positions of candidates applied to the first document size detection (A pattern), and FIG. 19 depicts positions of candidates applied to the second document size detection (B pattern), after having failed in the first document size detection.

As shown in Table 1 below, a reference-sensor table A (for the first document size detection), a reference-sensor table B (for the second document size detection), a reference-sensor table Y, and a size-determination table are respectively allocated to the standard size groups for various places of destination.

TABLE 1

| Standard size group | Reference-sensor table | Size-determination table Number |
|---|---|---|
| Standard size group 1. Japan | 1A, 1B, 1Y | 1 |
| Standard size group 2. United States | 2A, 2B, 2Y | 2 |
| Standard size group 3. Europe | 3A, 3B, 3Y | 3 |
| Standard size group 4. Asia (China) | 4A, 4B, 4Y | 4 |
| Standard size group 5. Asia (...) | 5A, 5B, 5Y | 5 |
| : | : | : |
| : | : | : |
| : | : | : |

For example, in the reference-sensor table 1A allocated to "Standard size group 1. Japan", it is written which one of the standard size groups shown in FIG. 14 among the candidates B11 to B71, B12 to B72 shown in FIG. 18 is placed on the contact glass 231, and only (the x, y address of) the candidate at the position suitable for determining the size in the x direction is written. Likewise, in the reference-sensor table 1B allocated to "Standard size group 1. Japan", it is written which one of the standard size groups shown in FIG. 15 among the candidates B11 to B71, B12 to B72 shown in FIG. 19 is placed on the contact glass 231, and only the candidate at the position suitable for determining the size in the x direction is written. In the reference-sensor table 1Y allocated to "Standard size group 1. Japan", it is written which one of the standard size groups shown by two-dot chain line in FIGS. 14 and 15 is placed on the contact glass 231, and the Y sensor read position (sensor No. of the reflecting type optical sensors Sy1 to Sy6) suitable for determining the size in the subscanning direction y is written. For example, the size-determination table 1 allocated to "Standard size group 1. Japan" is an encoded table or a LUT, in which a combination of the document presence detection result at respective candidates (it is not a candidate here and fixed as the position, and hence, the term "position" is used below) written in the reference-sensor table 1A or 1B and the document presence detection result at the y sensor read position in the reference-sensor table 1Y is associated with data indicating the document size, which forms the combination.

The entire reference-sensor tables and size-determination tables associated with the respective standard size groups in various places of destination are registered in the HDD (non-volatile storing unit). The operation board 220 includes an initialization setting key, and has an initialization setting function for displaying a menu screen for setting, changing, or adjusting various modes and parameters on a display of the operation board 220, when the initialization setting key is operated by an operator, and performing setting processing of the item when the operator specifies an item on the menu screen. By using this function, the operator can select or change one of the standard size groups. The standard size group selection information selected by the operator is registered in the HDD.

When the power of the ACP is turned on, and the operating voltage is applied to the system controller 31a, the system controller 31a executes the initialization, reads from the HDD the reference-sensor tables A, B, and Y and the size-determination table allocated to the standard size group specified in the standard size group selection information registered in the HDD, and writes these tables in the RAM (the used-table storing unit) in the IPU 2. Hereinafter, the table storage area in the RAM is expressed as a "table memory". The hardware of the IPU 2 is the same as that of the IPU 1, but has a larger size than the IPU 1, and the data (mainly a program) written in the control information memory CM of the IPU 2 from the HDD is different from that of the IPU 1, and hence, the image data processing function of the IPU 2 is different from that of the IPU 1. The processing functions of the IPU 2 include document size detection, scanner gamma correction, filter processing, color conversion, printer gamma conversion, tone conversion, dither processing, error diffusion processing, and the like.

FIG. 16 depicts the content of "read control" (RCPa) of the scanner control circuit 206 according to the third embodiment. Also in this "read control" (RCPa), as in the first and the second embodiments (FIG. 8), the scanner control circuit 206 detects opening/closing change of the platen 250p, when there is a change to "open", drives the first carriage to the set position Yr, Yra, and when there is a change to "close", lights up the lamp, to execute image read, while the first carriage returns from the set position Yr, Yra (step S18). At steps 13 and 15, however, the scanner control circuit 206 outputs the size detection instructions 1 and 2 to the IPU 1 and the IPU 2, respectively, and the IPU 1 performs shading correction with respect to all line-output image data in response thereto, and outputs the shading-corrected image data to the IPU 2. The operation of the IPU 2 will be described later with reference to FIG. 17.

Upon completion of image read, the scanner control circuit 206 according to the third embodiment outputs detection signals of the Y sensors Sy1 to Sy8 (1 bit per 1 signal, in total 8-bit data) to the IPU 2 (step S19a). The scanner control circuit 206 waits for the information of the document size detection result from the IPU 2, and when the IPU 2 transmits the document-size data, saves the data, and clears the register rFB (step S21). When the IPU 2 informs a failure to detect the document size, the scanner control circuit 206 returns to the read control for detecting the document size again. The read control by the scanner control circuit 206 according to the third embodiment when having received the start instruction is the same as that of the first embodiment shown in FIG. 9.

FIG. 17 depicts the content of "document size detection" (SDPb) by the IPU 2 according to the third embodiment. Upon reception of the "size detection instruction 1" (step S13), the IPU 2 refers to the frame gate signal FGATE, the line synchronizing signal LSYNC, and the pixel synchronizing clock pulse CLK output by the signal processing timing control circuit 213, to write the respective image data at positions defined in the reference-sensor table A in the "table memory" (RAM in the IPU 2) [numbers (k) of image data at positions B11 to B71 (positions in the first group), and a plurality of numbers of image data at positions B12 to B72 (positions in the second group) shown FIG. 18], in the respective RAMs 8 to 17 associated with the respective points in the buffer memory BM (steps S41 to 43a). Upon reception of the "size detection instruction 2" (step S15), the IPU 2 writes the respective image data at positions defined in the reference-sensor table B in the "table memory" [numbers (k) of image data at positions B11 to B71 (positions in the first group), and a plurality of numbers of image data at positions B12 to B72 (positions in the second group) shown FIG. 19], in the respective RAMs associated with the respective points in the buffer memory BM (steps S41, 44a, 45a).

The IPU 2 then calculates mean values Mi1 (first group) and Mi2 (second group) of the respective image data in the RAMs in the buffer memory BM and saves these mean values (step S46), binarizes the respective mean values to document presence/absence data Di1 (first group) and Di2 (second group), and saves these data in the register (step S47).

The IPU 2 then calculates a difference between the mean values Mi1 and Mi2 (i=1 to k) at the same position in the main-scanning direction, and sets "1" indicating that there is a document to the binary data Di (i=1 to 5) applied to the horizontal scanning position i, having a difference equal to or larger than the set value ΔD (steps S49, 50). With respect to the positions having a difference less than the set value ΔD, if Di1 and Di2 are the same, the IPU 2 writes the binary data Di1 at the position in the binary data Di applied to the position i (steps 51, 52). If Di1 and Di2 are not the same, the IPU 2 informs the system controller 31a and the scanner control circuit 206 of a failure to detect the X document size (step S58s). When the binary data is written in all of Di (i=1 to 5), the IPU 2 informs the system controller 31a and the scanner control circuit 206 of a failure to detect the X document size, also when all binary data indicate "0" (black: no document) (steps 55 to 58a). Otherwise, the IPU 2 assumes that the X document size detection is successful, encodes a combination of the distribution in the main-scanning direction of "I/O" of the binary data group Di (i=1 to k) and the detection signal corresponding to the y sensor read position in the reference-sensor table Y in the "table memory", on the document-size data by using the size-determination table in the "table memory", and transmits the encoded data to the system controller 31a and the scanner control circuit 206 (steps S56a, 57a).

According to the present invention, when document read is started at an early stage from the start of lighting up and drive of the illumination (232), rising of the luminous energy of the illumination (232) is not sufficient. Hence, even if the document size cannot be determined based on the image signals at a plurality of points (B01 to B51) at the first position, the document size can be detected highly reliably based on the image signals at a plurality of points (B02 to B52) at the second position. Furthermore, even when the luminous energy of the illumination (232) is sufficient, but read at the points (B01 to B51) at the first position is not satisfactory due to a black image or dirt, read at the points (B02 to B52) at the second position can be satisfactory, and the document size can be detected highly reliably based on the image signals at the points (B02 to B52) at the second position. That is, according to the present invention, the probability of accurate detection of the document size becomes high, without being affected by an unstable movement of the illumination and the state of the document.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document reading apparatus comprising:
   an illuminating light that illuminates a document;
   a driving unit that drives the illuminating light in a sub-scanning direction;
   an image pick-up device that reads the document in a main-scanning direction that is perpendicular to the sub-scanning direction, and outputs image signals;
   an optical unit that projects an image of the document illuminated by the illuminating light onto the image pick-up device;
   an image-signal extracting unit that extracts image signals at a plurality of points in the main-scanning direction of a first position and a second position in the sub-scanning direction, from among the image signals output, the first position and the second position being different in the sub-scanning direction;
   a document detecting unit that creates binary data indicating a presence of the document at each of the points, based on the image signals extracted; and
   a size detecting unit that:
      determines a size of the document in the main-scanning direction based on a distribution of presence and absence of the document indicated by the binary data for the first position in the main-scanning direction, when the binary data for the first position satisfies a condition for determining the size of the document size in the main-scanning direction, and
      when the binary data for the first position does not satisfy the condition, determines the size of the document in the main-scanning direction based on the distribution of presence and absence of the document indicated by the binary data for
   the second position in the main-scanning direction, if the binary data for the second position satisfies the condition;
   a light transmitting plate;
   a platen for pressing the document toward the light transmitting plate;
   an opening-status detecting unit that detects whether the platen is opened at an angle equal to or larger than a preset opening angle or closed at an angle equal to or less than the preset opening angle;
   a read control unit that drives the illuminating light forward to a first return position in the sub-scanning direction, which is within a document placing area on the light transmitting plate, in response to a change from "close" to "open" as a result of detection by the opening-status detecting unit, and lights up the illuminating light and drives the illuminating light backward, in response to a change from "open" to "close" as a detection result by the opening-status detecting unit, wherein
      the image-signal extracting unit extracts the image signal of the image pick-up device at the points in the sub-scanning direction during a backward movement of the illuminating light;
   a light transmitting window that is illuminated by the illuminating light at the standby position; and
   a document shifting unit that shifts a sheet-type document to pass the light transmitting window in the sub-scanning direction, wherein
   the read control unit selectively executes either one of a sheet-through read mode in which the illuminating light is fixed at the standby position and the image of the sheet-type document shifted is read, and a flatbed read mode in which the illuminating light is driven in the sub-scanning direction along the light transmitting plate, and wherein
   the read control unit executes the flatbed read mode, when the document-placement detecting unit has not detected the presence of a document at the time of receiving the document read instruction.

2. The document reading apparatus according to claim 1, wherein the document detecting unit calculates a mean value of image data obtained by digitally converting the image signals at each of the points, and converts the mean value into the binary data.

3. The document reading apparatus according to claim 1, wherein the points in the main-scanning direction at the first position and the second position include a plurality of points respectively located outside of edges in the main-scanning direction of respective standard documents having different sizes arranged on a reference plane with a corner of the standard documents matched with an origin of a document-reading reference plane, and a base point within an area of a smallest standard document arranged on the reference plane with the corner matched with the origin.

4. The document reading apparatus according to claim 3, wherein the condition is that the document is at the base point, and the document is not at one or more other points.

5. The document reading apparatus according to claim 1, further comprising a storing unit that stores a size-determination table in which the distribution of presence and absence of the document indicated by the binary data in the main-scanning direction is associated with data indicating the size of the document indicating the distribution, wherein
   the size detecting unit reads document-size data from the storing unit.

6. The document reading apparatus according to claim 1, further comprising:
   a nonvolatile storing unit that stores a reference-sensor table including a plurality of tables applied to each of a plurality of standard size groups in which a data group indicating a plurality of positions in the main-scanning direction for detecting the size of the document in one standard size group is designated as one table, and a size-determination table including a plurality of tables applied to each of the standard size groups in which the distribution of presence and absence of the document indicated by the binary data in the main-scanning direction in one reference-sensor table is associated with data indicating the size of the document indicating the distribution, designated as one table;
   a specifying unit that specifies one standard size group; and a used-table storing unit that stores one reference-sensor table and one size-determination table to be applied to the standard size group specified, wherein the document detecting unit creates the binary data at the points in the main-scanning direction in the reference-sensor table that is in the used-table storing unit, and the size detecting unit reads document-size data associated with the distribution from the size-determination table stored in the used-table storing unit.

7. The document reading apparatus according to claim 1, further comprising a Y-sensor that detects the presence and absence of the document at a plurality of positions in the sub-scanning direction, wherein the size detecting unit determines an entire size of the document based on a combination of the size of the document determined in the main-scanning direction and the presence and absence of the document at the positions in the sub-scanning direction detected by the Y-sensor.

8. The document reading apparatus according to claim 1, further comprising:

a Y-sensor that detects the presence and absence of the document at a plurality of positions in the sub-scanning direction; and a storing unit that stores a size-determination table in which a combination of the distribution of presence and absence of the document indicated by the binary data in the main-scanning direction the presence and absence of the document at a plurality of positions detected by the Y-sensor is associated with data indicating a size of the document that forms the combination, wherein the size detecting unit reads document-size data associated with the distribution of presence and absence of the document indicated by the binary data in the main-scanning direction and the presence and absence of the document at the positions in the sub-scanning direction detected by the Y-sensor, from the storing unit.

9. The document reading apparatus according to claim 1, further comprising:

a Y-sensor that detects the presence and absence of the document at a plurality of positions in the sub-scanning direction;

a nonvolatile storing unit that stores a reference-sensor table including a plurality of tables applied to each of a plurality of standard size groups, in which a data group indicating a plurality of positions in the main-scanning direction for detecting a size of the document in one standard size group and a data group indicating a position to be referred to among a plurality of positions in the sub-scanning direction, at which the Y-sensor detects the presence and absence of the document, are designated as one table, and a size-determination table applied to each of the standard size groups, in which a data group indicating a plurality of positions in the main-scanning direction in one reference-sensor table, and a combination of the distribution of presence and absence of the document indicated by the binary data in the main-scanning direction and the presence and absence of the document at a plurality of positions in the sub-scanning direction, specified by the position to be referred to among the positions in the sub-scanning direction, at which the Y-sensor detects the presence and absence of the document, are associated with data indicating the size of the document that forms the combination, designated as one table;

a specifying unit that specifies one standard size group; and a used-table storing unit that stores a set of reference-sensor table and size-determination table, to be applied to the standard size group specified in the nonvolatile storing unit, wherein the size detecting unit reads document-size data corresponding to the binary data obtained based on the image data read at the positions in the main-scanning direction in the reference-sensor table stored in the used-table storing unit and a result of detecting the document by the Y-sensor at the positions in the sub-scanning direction in the reference-sensor table, from the size-determination table stored in the used-table storing unit.

10. The document reading apparatus according to claim 1, further comprising a read control unit that drives the illuminating light forward to a return position in the sub-scanning direction corresponding to the size of the document, upon obtaining the document-size data at a time of receiving a document read instruction, and at the return position in the sub-scanning direction, returns the illuminating light backward to a standby position for waiting for the document read instruction.

11. The document reading apparatus according to claim 10, further comprising:

a light transmitting window that is illuminated by the illuminating light at the standby position; and a document shifting unit that shifts a sheet-type document to pass the light transmitting window in the sub-scanning direction, wherein the read control unit selectively executes either one of a sheet-through read mode in which the illuminating light is fixed at the standby position and the image of the sheet-type document shifted is read, and a flatbed read mode in which the illuminating light is driven in the sub-scanning direction.

12. The document reading apparatus according to claim 11, further comprising a document-placement detecting unit that detects a presence of the document in a document tray, wherein the read control unit executes the sheet-through read mode, when the document-placement detecting unit detects the presence of the document at a time of receiving the document read instruction.

13. The document reading apparatus according to claim 11, wherein the read control unit executes the flatbed read mode, when the document-placement detecting unit has not detected the presence of a document at the time of receiving the document read instruction.

14. The document reading apparatus according to claim 1, wherein the first return position in the sub-scanning direction is within an area of a smallest size of the document defined in the document reading apparatus.

15. The document reading apparatus according to claim 1, wherein when there is a mismatch in the binary data at each of the points in the sub-scanning direction at the same position in the main-scanning direction, the size detecting unit sends a document confirmation request.

16. The document reading apparatus according to claim 15, wherein the image-signal extracting unit extracts the image signals at points in the sub-scanning direction, different from the points in the sub-scanning direction from which the image signals have been extracted during a return movement before sending the document confirmation request, during the return movement after the size detecting unit has sent the document confirmation request.

17. The document reading apparatus according to claim 1, further comprising a Y-sensor that detects the presence and absence of the document at a plurality of positions in the sub-scanning direction on the light transmitting plate, wherein the read control unit reads a detection signal of the Y-sensor, in response to a change from "open" to "close" as a result of detection by the opening-status detecting unit, and the size detecting unit determines an entire size of the document based on a combination of the size of the document determined in the main-scanning direction and the presence and absence of the document at the positions in the sub-scanning direction detected by the Y-sensor.

18. The document reading apparatus according to claim 1, further comprising:

a Y-sensor that detects the presence and absence of the document at a plurality of positions in the sub-scanning direction on the light transmitting plate; and a storing unit that stores a size-determination table in which a combination of the distribution of presence and absence of the document indicated by the binary data in the main-scanning direction the presence and absence of the document at a plurality of positions detected by the Y-sensor is associated with data indicating a size of the document that forms the combination, wherein the read control unit reads a detection signal of the Y-sensor, in response to a change from "open" to "close" as a result of detection by the opening-status detecting unit, and the size detecting unit reads document-size data associated with the distribution of presence and absence of the document indicated by the binary data in the main-scanning direction and the presence and absence of the document at a plurality of positions in the sub-scanning direction detected by the Y-sensor, from the storing unit.

19. The document reading apparatus according to claim 1, further comprising:

a Y-sensor that detects the presence and absence of the document at a plurality of positions in the sub-scanning direction on the light transmitting plate;

a nonvolatile storing unit that stores a reference-sensor table including a plurality of tables applied to each of a plurality of standard size groups, in which a data group indicating a plurality of positions in the main-scanning direction for detecting a size of the document in one standard size group and a data group indicating a position to be referred to among a plurality of positions in the sub-scanning direction, at which the Y-sensor detects the presence and absence of the document, are designated as one table, and a size-determination table applied to each of the standard size groups, in which a data group indicating a plurality of positions in the main-scanning direction in one reference-sensor table, and a combination of the distribution in the main-scanning direction of the presence and absence of the document indicated by the binary data at respective positions in the main-scanning direction and the presence and absence of the document at a plurality of positions in the sub-scanning direction, specified by the position to be referred to among the positions in the sub-scanning direction, at which the Y-sensor detects the presence and absence of the document, are associated with data indicating the document size that forms the combination, designated as one table;

a specifying unit that specifies one standard size group; and a used-table storing unit that stores a set of reference-sensor table and size-determination table, to be applied to the standard size group specified in the nonvolatile storing unit, wherein the size detecting unit reads document-size data corresponding to the binary data indicating the presence and absence of the document obtained based on the image data read at the positions in the main-scanning direction in the reference-sensor table stored in the used-table storing unit and a result of detecting the document by the Y-sensor at the positions in the sub-scanning direction in the reference-sensor table, from the size-determination table stored in the used-table storing unit.

20. The document reading apparatus according to claim 1, wherein the read control unit drives the illuminating light forward to a return position in the sub-scanning direction corresponding to the size of the document, upon obtaining the document-size data at a time of receiving a document read instruction, and at the return position in the sub-scanning direction, returns the illuminating light backward to a standby position for waiting for the document read instruction.

21. The document reading apparatus according to claim 1, further comprising a document-placement detecting unit that detects a presence of the document in a document tray, wherein the read control unit executes the sheet-through read mode, when the document-placement detecting unit detects the presence of the document at a time of receiving the document read instruction.

\* \* \* \* \*